US011670441B2

(12) United States Patent
Carpenter

(10) Patent No.: US 11,670,441 B2
(45) Date of Patent: Jun. 6, 2023

(54) PEROVSKITE MANGANESE OXIDES WITH STRONG MAGNETOCALORIC EFFECT AND USES THEREOF

(71) Applicant: Virginia Commonwealth University, Richmond, VA (US)

(72) Inventor: Everett E. Carpenter, Mechanicsville, VA (US)

(73) Assignee: VIRGINIA COMMONWEALTH UNIVERSITY, Richmond, VA (US)

(*) Notice: Subject to any disclaimer, the term of this patent is extended or adjusted under 35 U.S.C. 154(b) by 409 days.

(21) Appl. No.: 16/768,173

(22) PCT Filed: Dec. 1, 2018

(86) PCT No.: PCT/US2018/063523
§ 371 (c)(1),
(2) Date: May 29, 2020

(87) PCT Pub. No.: WO2019/109059
PCT Pub. Date: Jun. 6, 2019

(65) Prior Publication Data
US 2020/0294697 A1 Sep. 17, 2020

Related U.S. Application Data

(60) Provisional application No. 62/593,443, filed on Dec. 1, 2017.

(51) Int. Cl.
*H01F 1/01* (2006.01)
*F25B 21/00* (2006.01)
(52) U.S. Cl.
CPC ............. *H01F 1/012* (2013.01); *F25B 21/00* (2013.01); *F25B 2321/002* (2013.01)

(58) Field of Classification Search
CPC ........................... F25B 21/00; F25B 2321/002
See application file for complete search history.

(56) References Cited

U.S. PATENT DOCUMENTS 9,927,155 B2 * 3/2018 Boeder ................... F25B 21/00
2004/0261420 A1 * 12/2004 Lewis ..................... H01F 1/017
141/121

(Continued)

FOREIGN PATENT DOCUMENTS

CN 101224907 A 7/2008
EP 0669296 A1 8/1995

OTHER PUBLICATIONS

Percharsky, V. K., et al. "Thermodynamics of the magnetocaloric effect," The American Physical Society; Physical Review B, vol. 64, 144406 (2001) DOI: 10.1103/PhysRevB.64.144406.

(Continued)

*Primary Examiner* — Ana M Vazquez
(74) *Attorney, Agent, or Firm* — Thomas | Horstemeyer, LLP

(57) ABSTRACT

In various aspects, methods of making perovskite manganese oxide particles are provided as well as perovskite manganese oxide particles made therefrom. The perovskite manganese oxide particles exhibit a strong magnetocaloric effect, making them well suited for applications in power generation and magnetic refrigeration, especially at or near room temperature. The methods can include forming an aqueous mixture of (i) a low-molecular-weight polymeric polyalcohol gel precursor, (ii) a stoichiometric amount of metal salts or hydrates thereof, wherein the metal salts or hydrates thereof comprise at least a Manganese (Mn), and (iii) a polybasic carboxylic acid; polymerizing the aqueous mixture to form a gel containing perovskite manganese oxide nanoparticles entrapped therein; and calcining the gel to remove at least a portion of organic material in the gel and (Continued)

form the perovskite manganese oxide particles. Method and systems are also provided for power generation and magnetic refrigeration using the perovskite manganese oxide particles.

30 Claims, 19 Drawing Sheets

(56) References Cited

U.S. PATENT DOCUMENTS

2012/0033002 A1 2/2012 Seeler et al.
2015/0267943 A1* 9/2015 Kim .................. F25B 21/00
                                                          62/3.1

OTHER PUBLICATIONS

Gomez, J. Romero, et al. "Magnetocaloric effect: A review of the thermodynamic cycles in magnetic refrigeration" RenewableandSustainableEnergyReviews (2012).
Phan, Manh-Huong et al. "Review of the magnetocaloric effect in manganite materials," Journal of Magnetism and Magnetic Materials 308 (2007), PACS: 75.30.Sg.
Pecharsky, A.O., et al. "The giant magnetocaloric effect of optimally prepared," American Institute of Physics, Journal of Applied Physics 93, 4722 (2003); vol. 93, No. 8.
Andrade, V. M., et al. "Magnetic and magnetocaloric properties of La0.6Ca0.4MnO3 tunable by particle size and dimensionality," Acta Materialia 102 (2016) 49e55.
Lebedev, O. I., et al, "Structure and microstructure of La12xCaxMnO32d thin films prepared by pulsed laser deposition," The American Physical Society; Physical Review B, vol. 58, No. 12 (1998).
Pekala, M., et al, "Magnetocaloric effect in nano- and polycrystalline manganite La0.7Ca0.3MnO3," Applied Physics A—Materials Science & Processing, Appl. Phys. A 90, 237-241 (2008), DOI: 10.1007/s00339-007-4309-x.
Phan, Manh-Huong, et al, "Large magnetocaloric effect in a La0.7Ca0.3MnO3 single crystal," American Institute of Physics; Journal of Applied Physics 96, 1154 (2004), vol. 96, No. 2.
Gencer, H., et al, "Production of LaCaMnO3 Composite by Ball Milling," Acta Physica Polonica A; vol. 125 (2014), DOI: 10.12693/APhysPolA.125.214.
Danks, A. E., et al. "The evolution of 'sol-gel' chemistry as a technique for materials synthesis," Royal Society of Chemistry, Materials Horizons (2015), DOI: 10.1039/c5mh00260e.
Wang, Xingang, et al. "A simple sol-gel technique for preparing lanthanum oxide nanopowders" Elsevier, Materials Letters 60 (2006) 2261-2265, 2005, doi:10.1016/j.matlet.2005.12.142.
Hueso, L. E., et al, "Tuning of the magnetocaloric effect in La0.67Ca0.33MnO3-6 nanoparticles synthesized by sol-gel techniques," American Institute of Physics, Journal of Applied Physics 91, 9943 (2002), vol. 91, No. 12, DOI: 10.1063/1.1476972.
Lampen, P., et al. "Impact of reduced dimensionality on the magnetic and magnetocaloric response of La0.7Ca0.3MnO3," American Institute of Physics, Applied Physics Letters 102, 062414 (2013), https://doi.org/10.1063/1.4792239.
Marek, Pekala, "Magnetic field dependence of magnetic entropy change in nanocrystalline and polycrystalline manganites," American Institute of Physics, J. Appl. Phys. 108, 113913 (2010),doi:10.1063/1.3517831.
Oesterreicher, H. et al. "Magnetic cooling near Curie temperatures above 300 K," American Institute of Physics, Journal of Applied Physics 55, 4334 (1984) https://doi.org/10.1063/1.333046.
Schiffer, P. et al, "Low Temperature Magnetoresistance and the Magnetic Phase Diagram of La1-x CaxMnO3," The American Physical Society, Physical Review Letters (1995), vol. 75, No. 18.
Kim, K. H, et al. "Frequency Shifts of the Internal Phonon Modes in La0.7Ca0.3MnO3," The American Physical Society, Physical Review Letters (1996), vol. 77, No. 9.
Pekala, M., et al. "Magnetocaloric effect in nano- and polycrystalline manganites La0.5Ca0.5MnO3," Elsevier, Journal of Alloys and Compounds 507 (2010) 350-355, doi:10.1016/j.jallcom.2010.07.165.
Xi, Shaobo, et al. "Magnetic properties and magnetocaloric effect of La0.8Ca0.2MnO3 nanoparticles tuned by particle size," American Institute of Physics., J. Appl. Phys. 111, 063922 (2012); https://doi.org/10.1063/1.3699037.
Biswas, Anis, et al. "Magnetocaloric properties of nanocrystalline LaMnO3: Enhancement of refrigerant capacity and relative cooling power," Elsevier, Journal of Alloys and Compounds 545 (2012) 157-161, (2012), http://dx.doi.org/10.1016/j.jallcom.2012.08.001.
Pekala, M., et al. "MagnetocaloriceffectinLa0.75Sr0.25MnO3 manganite," Elsevier, Journal of Magnetism and Magnetic Materials322(2010)3460-3463, (2021), doi:10.1016/j.jmmm.2010.06.045.
Zeug, Hong, et al. "Magnetic entropy change in bulk nanocrystalline Gd metals," Springer, (2011), Original Article, DOI 10.1007/s13204-011-0007-2.
Zhang, Linlin, et al. "Magnetocaloric effect in high Gd content Gd—Fe—Al based amorphous/nanocrystalline systems with enhanced Curie temperature and refrigeration capacity," AIP Publishing, AIP Advances 6, 035220 (2016), https://doi.org/10.1063/1.4945407.
Tsui et al: Enhanced near room temperature magnetocaloric effect in La 0.6 Ca 0.4 MnO 3 for magnetic refrigeration application11, RSC ADV., vol. 7, No. 74, Oct. 2, 2017, pp. 46589-46593.
Zhong et al: Dependence of the magnetocaloric effect on oxygen stoichiometry in polycrystalline La"2"/"3Ba"1" /"3Mn0"3"-"@d", Journal of Magnetism and Magnetic Materials, vol. 261, No. 1-2, Apr. 1, 2003, pp. 238-243.
Lopez et al:Specific heat and magnetic properties of Nd0.5Sr0.5Mn03 and R0.5Ca0.5Mn03 (R=Nd, Sm, Dy, and Ho), Journal of Applied Physics, vol. 94, No. 7, Oct. 1, 2003, pp. 4395-4399.
Zhong et al: Synthesis, structure and magnetic entropy change of polycrystalline La"1"-"xK"xMn0"3"+"@d", Journal of Magnetism and Magnetic Materials, vol. 195, No. 1, Apr. 1, 1999, pp. 112-118.
EP Search Report dated Jul. 26, 2021 for EP Application No. 18884591.1.
Tsui et al., Enhanced Near Room Temperature Magnetocaloric Effect in La0.6Ca0.4MnO3 for Magnetic Refrigeration Application, p. 46589 col. 2 para 2, Oct. 2, 2017.
International Search Report issued for application PCT/US2018/063523, dated Feb. 14, 2019.

* cited by examiner

PEROVSKITE MANGANESE OXIDES WITH STRONG MAGNETOCALORIC EFFECT AND USES THEREOF

CROSS-REFERENCE TO RELATED APPLICATIONS

This application claims priority to, and the benefit of, U.S. provisional application entitled "PEROVSKITE MANGANESE OXIDES WITH STRONG MAGNETOCALORIC EFFECT" having Ser. No. 62/593,443, filed Dec. 1, 2017, the contents of which are incorporated by reference in their entirety.

STATEMENT REGARDING FEDERALLY SPONSORED RESEARCH OR DEVELOPMENT

This invention was made with government support under award 5-17434 awarded by the National Science Foundation. The government has certain rights in the invention.

TECHNICAL FIELD

The present disclosure generally relates to metal oxides, especially those having a strong magnetocaloric effect.

BACKGROUND

There has been growing interest in the development of materials for magnetic refrigeration applications as it provides an environmentally-friendly option to replace chlorofluorocarbons (CFCs) and hydrochlorofluorocarbons (HFCs) as refrigerants.[1] Magnetic refrigeration (MR) technology is based on the magnetocaloric effect (MCE) where the cooling efficiency is dependent upon the relative cooling power (RCP) of the material.[1,2] The MCE is a measure of thermal response to change in an external magnetic field.[2] It is based on the thermodynamic correlation of reversible change in magnetic entropy in an isothermal process defined using the Maxwell relations[3] shown in equation 1:

$$\Delta S_M(\Delta H) = \int_{H_1}^{H_1} \left(\frac{\partial M}{\partial T}\right)_H dH \quad (1)$$

where $\Delta S_M$ is the change in magnetic entropy, $\Delta H$ is the change in applied field, M is the magnetization, and T represents temperature. Near room temperature magnetocaloric materials with Curie temperature $T_C$ near 300 K are of particular interest. Pecharsky et al. reported that GdSiGe based materials with entropy change of 36 J kg$^{-1}$ K$^{-1}$ at $T_C$=272 K for a field change of 0-5T.[4] However, perovskite manganite with $La_{1-x}Ca_xMnO_3$ (LCMO) have been gaining interest due to its near room temperature large entropy change of 8.3 J kg$^{-1}$ K$^{-1}$ at 270 K for a field change of 0-5T.[5]

There remains a need for new magnetocaloric materials and methods of making and uses thereof.

SUMMARY

In various aspects, perovskite manganese oxide particles and methods of making are provided that overcome one or more of the aforementioned deficiencies. In particular, methods of making perovskite manganese oxide particles are provided and perovskite manganese oxide particles formed therefrom are provided that have a strong magnetocaloric effect. Methods and systems utilizing the perovskite manganese oxide particles are also provided, for example for power generation or magnetic refrigeration.

In various aspects, the methods can include forming an aqueous mixture of (i) a low-molecular-weight polymeric polyalcohol gel precursor, (ii) a stoichiometric amount of metal salts or hydrates thereof, wherein the metal salts or hydrates thereof include at least a Manganese (Mn), and (iii) a polybasic carboxylic acid; followed by polymerizing the aqueous mixture to form a gel containing the perovskite manganese oxide nanoparticles entrapped therein; and then calcining the gel to remove at least a portion of organic material in the gel and form the perovskite manganese oxide particles.

In particular aspects, the methods include making perovskite manganese oxide particles having a formula $La_{1-x}Ca_xMnO_3$ or $La_{1-x}Sr_xMnO_3$, wherein x is about 0.1 to 0.5 using a low molecular-weight polyethylene glycol having a number average molecular weight of about 400 Daltons to about 1000 Daltons. The perovskite manganese oxide particles can have an average crystallite size of about 25 nm to 75 nm when measured according to the Sherrer equation using the highest intensity peak in the X-ray diffraction of the plurality of particles. The perovskite manganese oxide particles can also have an average particle size of about 25 nm to 125 nm when measured by transmission electron microscopy. The perovskite manganese oxide particles can also have a relative cooling power (RCP) of about 600 J Kg$^{-1}$ to 1600 J Kg$^{-1}$ and a magnetic entropy ($-\Delta S_M$) of about 15 Jkg$^{-1}$K$^{-1}$ to about 30 Jkg$^{-1}$K$^{-1}$ when measured at 278 K for a field change of 0-3 T.

In various aspects, perovskite manganese oxide particles are also provided. The perovskite manganese oxide particles can be prepared by the methods described herein. The perovskite manganese oxide particles can have an average crystallite size of about 25 nm to 75 nm when measured according to the Sherrer equation using the highest intensity peak in the X-ray diffraction of the plurality of particles; and an average particle size of about 25 nm to 125 nm when measured by transmission electron microscopy. Applicants have found that perovskite manganese oxide particles having these crystallite and particle sizes can produce much stronger magnetocaloric effect than has been previously observed for perovskite manganese oxide particles, making them particularly useful for applications at or near room temperature.

Methods and systems for generating power using the perovskite manganese oxide particles are also provided. The methods can include applying heat from a heat source to a plurality of perovskite manganese oxide particles. In various aspects, power generation devices are also provided including a thermomagnetic generator containing the perovskite manganese oxide particles.

Methods and systems for refrigeration using the perovskite manganese oxide particles are also provided. The methods can include applying an oscillating magnetic field to a plurality of perovskite manganese oxide. In various aspects, refrigeration devices are provided including an active magnetic regenerator (AMR) containing a plurality of the perovskite manganese oxide particles.

Other systems, methods, features, and advantages of perovskite manganese oxide particles, methods of making thereof, and uses thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1:
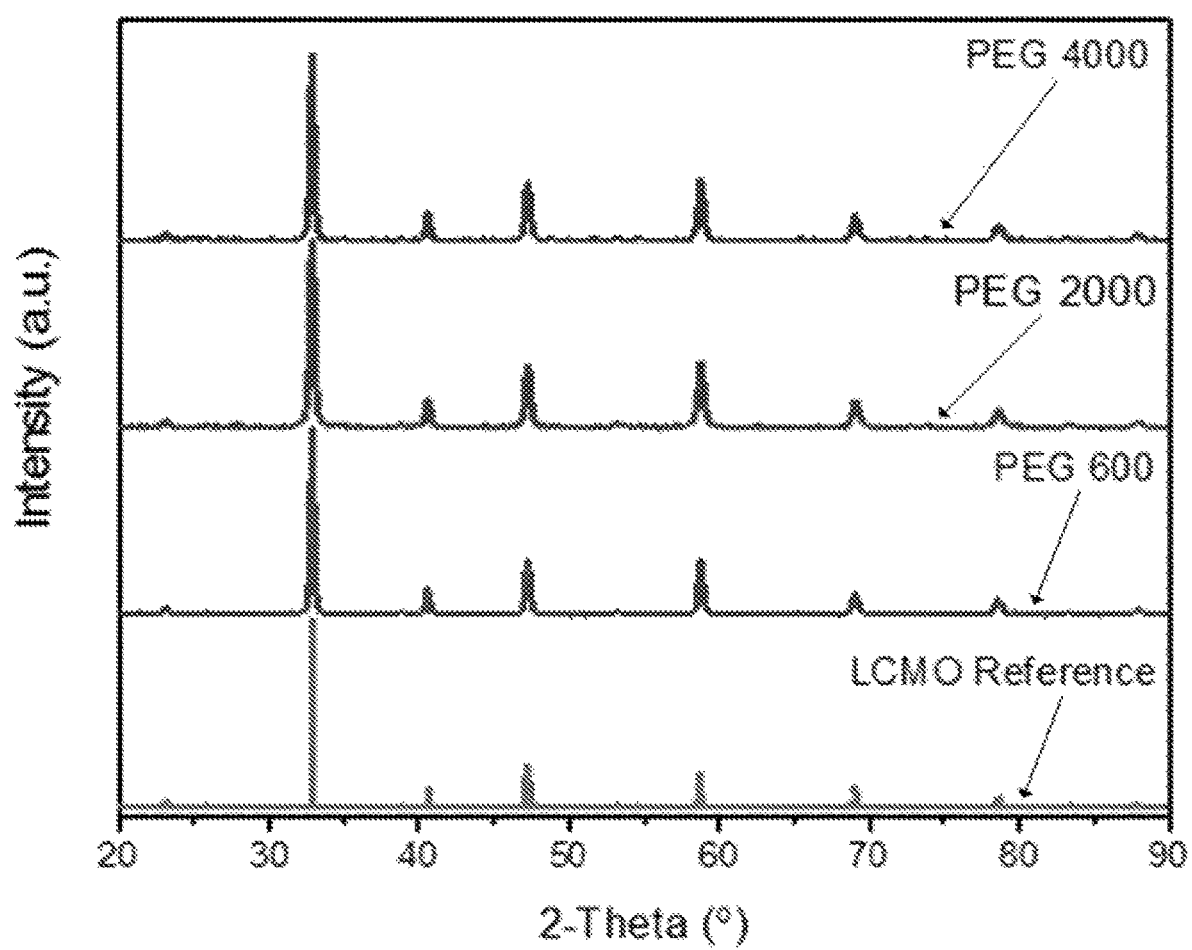
FIG. 1 shows XRD patterns of the as-synthesized LCMO nanocomposites.
Figures 2A, 2B, 2C, 2D, 2E, 2F, 2G, 2H, 2I:
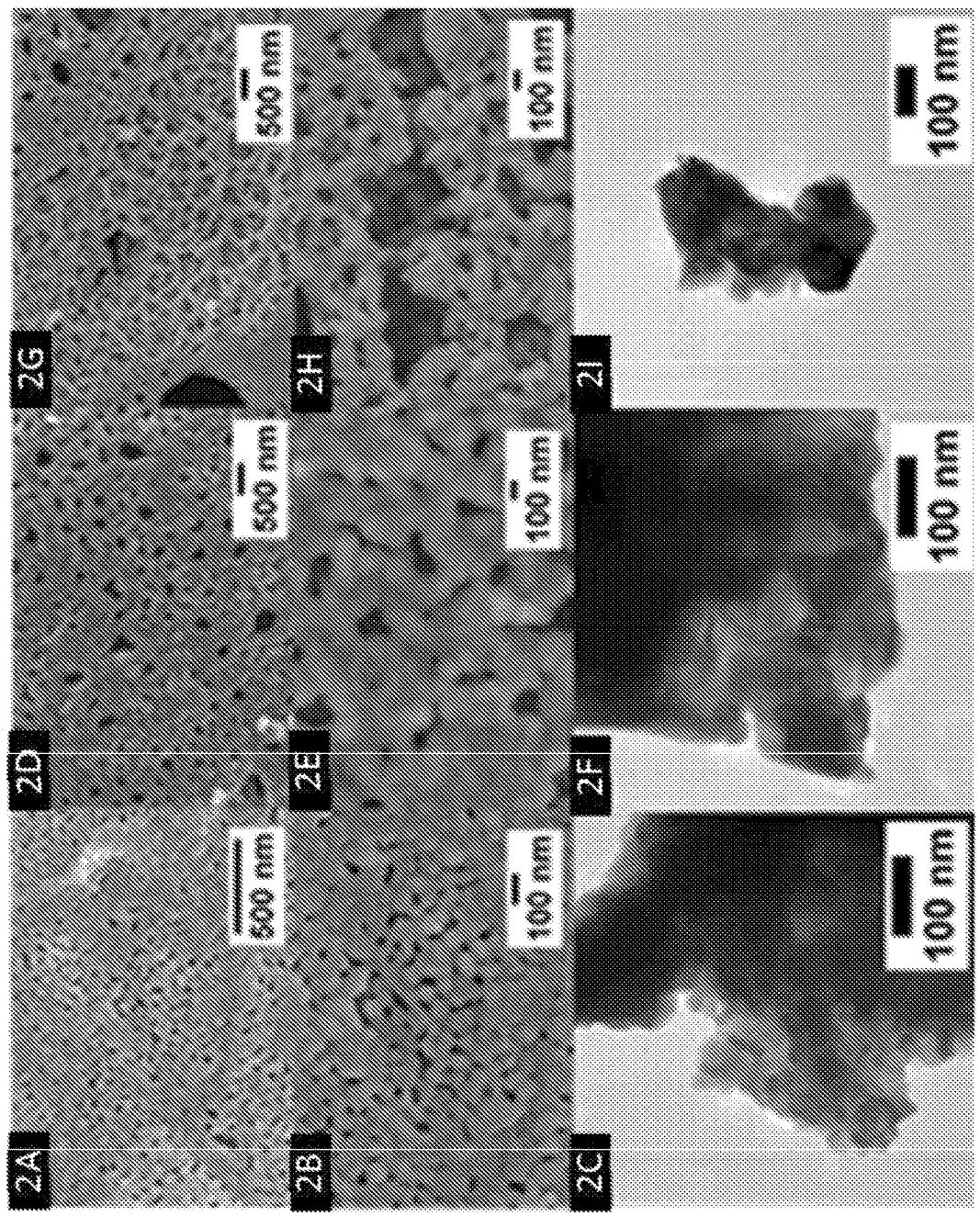
FIGS. 2A-2I show SEM and TEM micrographs of particles at different magnifications synthesized using (FIGS. 2A-2C) PEG 600 (FIGS. 2D-2F) PEG 2000, (FIGS. 2G-2I) PEG 4000.

In various aspects, perovskite manganese oxides and method of making perovskite manganese oxides are provided. The perovskite manganese oxides exhibit a strong magnetocaloric effect, having potential applications for energy generation and cooling.

Lanthanum based perovskite manganites can be synthesized by ball milling, floating zone, pulsed laser deposition, and sol-gel methods.[6-9] Major advantages in obtaining nanomaterials via sol-gel process include the ability to control the nucleation and growth steps resulting in large scale production of monodispersed particles in comparison to other methods. The sol-gel method in the synthesis of perovskite manganites typically involve the dissolution of metal precursor along with citric acid and polyethylene glycol (PEG) in water.[10] The presence of citric acid and PEG allow the formation of metal chelate complexes within the solution catalyzing the polymerization and formation of the gel.[10] In the perovskite manganites system, Wang et al. suggested that PEG polymer encapsulate the $La(NO_3)_3$ in controlling the nucleation and growth of particles by creating steric hindrance between the neighboring monomers.[11] In this work, we modified PEG chain length in the synthesis of the LCMO nanocomposites. Through this method, we report a significant enhancement in the magnetocaloric properties of the existing $La_{0.6}Ca_{0.4}MnO_3$ material by varying the chain length of the PEG polymer.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Perovskite Manganese Oxides and Methods of Making Thereof

In various aspects, perovskite manganese oxides are provided having a strong magnetocaloric effect. The perovskite manganese oxides can include metals such as Lanthanum (La), Cerium (Ce), Praseodymium (Pr), Calcium (Ca), Strontium (Sr), Barium (Ba), or a combination thereof. The perovskite manganese oxides can include doped manganese oxides including a trivalent rare-earth metal and a divalent metal, wherein a molar ratio of a first total amount of Mn to a second total amount of trivalent rare-earth metal and divalent metal in the aqueous mixture is about 1. For example, in some aspects, the perovskite manganese oxide is $La_{1-x}Ca_xMnO_3$, wherein x is about 0.1, 0.2, 0.3, 0.4, 0.5, 0.6, or any interval or combination thereof. In some aspects, the perovskite manganese oxide is $La_{1-x}Sr_xMnO_3$, wherein x is about 0.1, 0.2, 0.3, 0.4, 0.5, 0.6, or any interval or combination thereof.

A plurality of perovskite manganese oxide particles provided herein can have an average crystallite size of about 25 nm to 75 nm or about 50 nm to 75 nm when measured according to the Sherrer equation using the highest intensity peak in the X-ray diffraction of the plurality of particles. A plurality of perovskite manganese oxide particles provided herein can have an average particle size of about 25 nm to 125 nm, about 25 nm to 50 nm, or about 25 nm to 75 nm when measured by transmission electron microscopy. The plurality of particles can have a particle-like morphology. The term, "particle like morphology," as used herein, refers to a plurality of particles that are not aggregated or agglomerated, but rather remain distinguishable such that individual crystallites can be isolated.

A plurality of perovskite manganese oxide particles can be made by a method provided herein. The method can include a modified Pechini method. The method can include forming an aqueous mixture (solution or suspension) of metal salts (or hydrates thereof) with a low-molecular-weight polymeric polyalcohol gel precursor, forming a gel entrapping particles of the perovskite manganese oxide, and then calcining the gel to remove the organics and form the perovskite manganese oxide.

The method can include forming an aqueous mixture comprising (i) a low-molecular-weight polymeric polyalcohol gel precursor, (ii) a stoichiometric amount of metal salts or hydrates thereof, wherein the metal salts or hydrates thereof include at least a Manganese (Mn), and (iii) a polybasic carboxylic acid. A mixture can be a stable aqueous chelated solution or suspension with the cation. The polybasic carboxylic acid can form chelates that chelate the metals in the mixture. The mixture can be stable over time preventing precipitation, as this can introduce in homogeneities in the resulting material.

The method can include polymerizing the aqueous mixture to form a gel having perovskite manganese oxide nanoparticles entrapped therein. For example, the polymerization can include one or both of (i) lowering the pH of the aqueous mixture by the addition of an acid and (ii) heating the aqueous mixture to a first elevated temperature for a first period of time to form the gel. Acids such as nitric acid can be added to adjust the pH. In some aspects, the first elevated temperature is about 50° C. to 100° C., about 60° C. to 90° C., or about 65° C. to 80° C. In some aspects, the first period of time is about 3 hours to 10 hours or about 4 hours to 8 hours.

The method can include calcining the gel to remove at least a portion of organic material in the gel and form the perovskite manganese oxide particles. In some aspects, all or substantially all of the organic material is removed. In some aspects, the calcining step includes heating the gel to a second elevated temperature for a second period of time to remove the portion of the organic material. In some aspects, the second elevated temperature is selected from the group consisting of about 400° C. to 1200° C., about 500° C. to 1100° C., or about 600° C. to 1000° C. The period of time can be adjusted to remove all or substantially all of the organic material. In some aspects, the period of time is about 8 hours to 15 hours, about 8 hours to 12 hours, or about 10 hours.

The metal salts or hydrates can include a metal hydroxide, a metal alkoxide, a metal acetate, a metal chloride, a metal citrate, a metal nitrate, or a combination thereof. The metal salts or hydrates thereof can include, in addition to Mn, a metal selected from the group consisting of Lanthanum (La), Cerium (Ce), Praseodymium (Pr), Neodymium (Nd), Gadolinium (Gd), Calcium (Ca), Strontium (Sr), Barium (Ba), and a combination thereof. Doped manganese oxides can be prepared using a trivalent rare-earth metal and a divalent metal, e.g. wherein a molar ratio of a first total amount of Mn to a second total amount of trivalent rare-earth metal and divalent metal in the aqueous mixture is about 1. For example, the metal salts can include La and Ca, and the perovskite manganese oxide particles can include $La_{1-x}Ca_xMnO_3$, or the metal salts can include La and Sr, and the perovskite manganese oxide particles can include $La_{1-x}Sr_xMnO_3$. The metal salts or the hydrate thereof can be present in the aqueous mixture at any suitable concentration, e.g. a concentration of about 0.1 M to 1.0 M.

The low-molecular-weight polymeric polyalcohol gel precursor can include a variety of gel precursors that are capable of forming a gel containing the particles of the perovskite manganese oxide material. The term "low-molecular-weight", when applied to a polymer herein, is used to describe polymeric materials (as opposed to monomeric or oligomeric materials) having a number average molecular weight of about 10000 Da, about 8000 Da, about 6000 Da, or about 5000 Da or less. The term "oligomeric" is used herein to refer to materials containing more than one, but less than about 30, less than about 20, or less than about 12 repeat units. In some aspects, the low-molecular-weight polymeric polyalcohol gel precursor is or includes a low-molecular-weight polyvinyl alcohol. In some aspects, the low-molecular-weight polymeric polyalcohol gel precursor is or includes a low-molecular-weight polyethylene glycol. In some aspects, the low-molecular-weight polymeric polyalcohol gel precursor has a number average molecular weight of about 400 Da to about 5000 Da, about 500 Da to about 4000 Da, or about 400 Da to about 1000 Da. In some aspects, the low-molecular-weight polymeric polyalcohol gel precursor is present in the aqueous mixture at a weight ratio (w/w) of low-molecular-weight polymeric polyalcohol gel precursor to the metal of about 1:15 to 1:5, about 1:12 to 1:8, or about 1:10.

The polybasic carboxylic acid can include any suitable polybasic carboxylic acid such as citric, glycolic, tartaric, maleic, hydroxymaleic, hydroxytartaric, malonic, malic, lactic, tartronic, gluconic, saccharic, glucuronic, mucic, mannosaccharic and a combination thereof. In some aspects, the polybasic carboxylic acid is present in the aqueous mixture at a weight ratio (w/w) of the polybasic carboxylic acid to the metal of about 1:15 to 1:5, about 1:12 to 1:8, or about 1:10.

The perovskite manganese oxide particles can have a strong magnetocaloric effect. For example, the perovskite manganese oxide particles can have a relative cooling power (RCP) of about 600 J $Kg^{-1}$ to 1600 J $Kg^1$ at 278 K for a field change of 0-3 T. The perovskite manganese oxide particles can have a relative cooling power (RCP) of about 900 J $Kg^{-1}$ to 1600 J $Kg^{-1}$ at 278 K for a field change of 0-5 T. The perovskite manganese oxide particles can have a magnetic entropy ($-\Delta S_M$) of about 10 $Jkg^{-1}K^{-1}$ to about 30 $Jkg^{-1}K^{-1}$ or about 15 $Jkg^{-1}K^{-1}$ to about 30 $Jkg^{-1}K^-1$ when measured at 278 K for a field change of 0-3 T.

The strong magnetocaloric effect provides many beneficial applications as will be described in greater detail elsewhere herein. For example, the magnetocaloric effect is used for waste heat recovery. As heat is applied to the material in a cyclical fashion it generates electricity. It can also be used for magnetic refrigeration. In this configuration, the material is put in an oscillating magnetic field and gets cooler. This is useful for solid state refrigeration. In some aspects, a magnetic refrigeration device is provided having a refrigerant material with a plurality of perovskite manganese oxide particles described herein. Methods of active magnetic refrigeration are provided by applying an oscillating magnetic field to a plurality of perovskite manganese oxide particles described herein. Methods of generating electricity are also provided by applying heat from a heat source to a plurality of perovskite manganese oxide particles described herein. The heat can be excess heat, e.g. from a reactor or other industrial process, or can be heat from a geothermal source.

Power Generation Devices Including Perovskite Manganese Oxides and Methods of Use Thereof In various aspects, power generation devices are provided including a perovskite manganese oxide described herein. The perovskite manganese oxide described herein can exhibit a strong magnetocaloric effect, even at or near room temperature and/or with lower strength magnets that conventional magnetocaloric materials, which can make the particularly useful for power generation and in particular for power generation using low-grade waste heat (having a temperature of about 230° C., about 150° C., about 100° C., about 75° C., about 60° C., or less). The majority of waste heat released into the atmosphere is low-grade waste heat, for which many conventional thermoelectric generators, have poor efficiency at low temperature gradients and therefore are not cost-effective.

Figure 8:
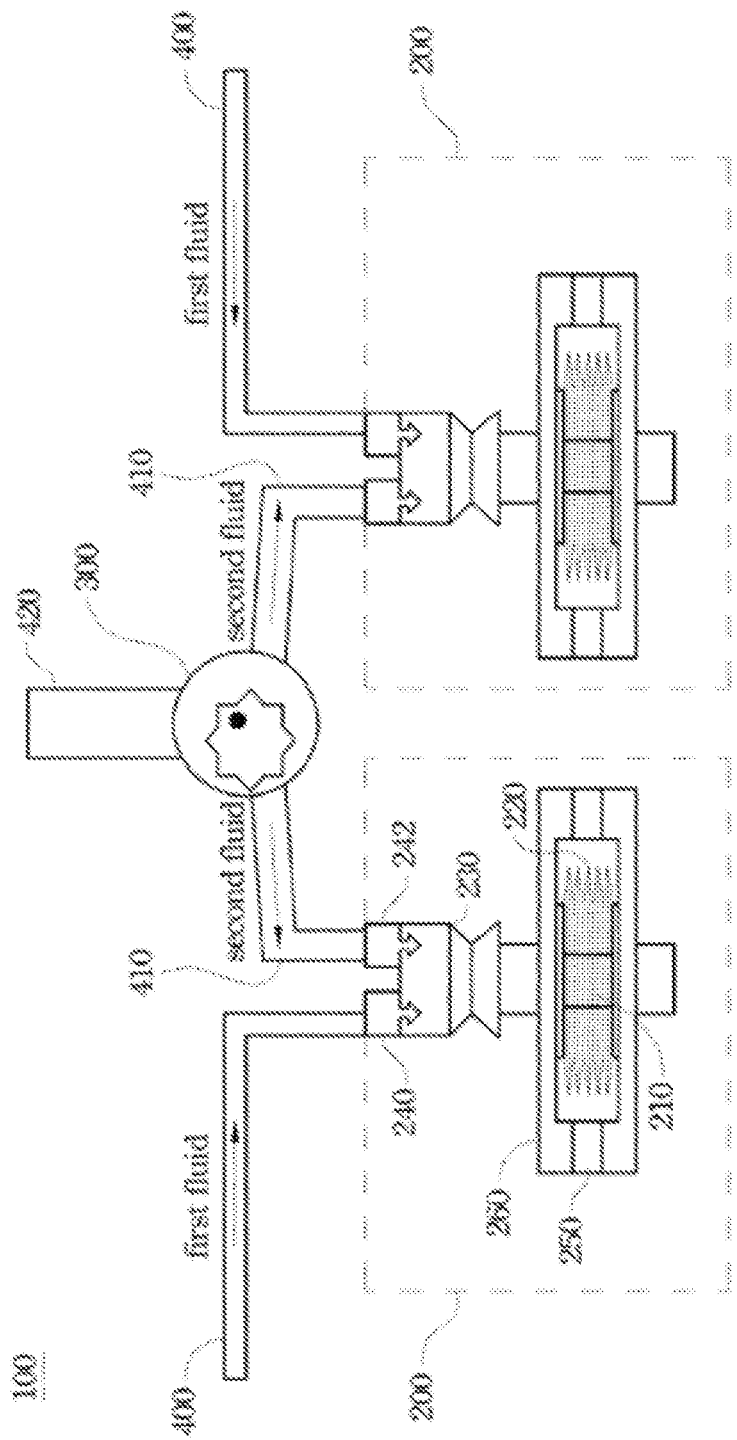
FIG. 8 is a schematic diagram of a first exemplary power generation device according to one aspect of the present disclosure.

A schematic of a first exemplary power generation device 100 is depicted in FIG. 8. As shown in FIG. 8, the power generation device 100 includes a plurality of thermomagnetic generators 200 and a flow controller 300. The thermomagnetic generators 200 acquire first fluids respectively. The flow controller 300 controls flow rates of the second fluids flowing into the respective thermomagnetic generators, wherein a fluid temperature of the first fluid is different from a fluid temperature of the second fluid.

The flow rates of the second fluids flowing into the respective thermomagnetic generators 200 are changed by means of the flow controller 300, and therefore a temperature of the mixed fluid that flows to each thermomagnetic material 210 is changed such that the thermomagnetic material can alternate between high permeability and a low permeability according as alternate low and high temperature of the mixed fluid. Thus, the coil 220 is induced to generate power.

The first fluid conduits 400 are connected to the thermomagnetic generators 200 respectively, so as to deliver the first fluids to the thermomagnetic generators 200 respectively. The second fluid conduits 410 are connected from the flow controller 300 to the thermomagnetic generators respectively, so as to deliver the second fluids to the thermomagnetic generators 300 respectively. The third fluid conduit 420 is connected to the flow controller 300, so as to deliver the second fluids into the flow controller 300. In use, the first fluids flow into the respective thermomagnetic generators 200 via the first fluid conduits 400. The flow controller 300 acquires a total amount of the second fluids and then delivers the second fluids to the respective thermomagnetic generators 300.

In some aspects, the first and second fluids are liquids, so as to facilitate transportation. For example, the first fluid is relatively hot water, and the second fluid is relatively cold water. Alternatively, in other aspects, the first and second fluids are a gas. In some aspects, the fluid can alternate between a liquid and a gas upon cooling/heating.

For avoiding a backflow of the thermomagnetic generator 200, each of the thermomagnetic generators 200 includes a first check valve 240 and a second check valve 242. The first check valve 240 is disposed between the first fluid conduit 400 and the fluidic mixer 230 and is connected to the first fluid conduit 400 and the fluidic mixer 230; the second check valve 242 is disposed between the second fluid conduit 410 and the fluidic mixer 230 and is connected to the second fluid conduit 410 and the fluidic mixer 230. In use, the first check valve 240 allows the first fluid into the fluidic mixer 230; the second check valve 242 allows the second fluid into the fluidic mixer 230. Thus, the mixed fluid cannot reversely flow from the fluidic mixer 230 to the first fluid conduit 400 and/or the second fluid conduit 410.

In FIG. 8, the power generation device 100 has two thermomagnetic generators 200. In one embodiment, the first fluid is hot water, and the second fluid is cold water. In one step, the flow controller 300 can guide and distributes a more portion of the cold water to the right thermomagnetic generator 200 and a less portion of the cold water to the left thermomagnetic generator 200. Therefore, the left thermomagnetic generator 200 mixes the hot water with the less portion of the cold water, in which this mixed water reaches a relatively high temperature, so that the left thermomagnetic material 210 can become low permeability; the right thermomagnetic generator 200 mixes the hot water with the more portion of the cold water, in which this mixed water reaches a relatively low temperature, so that the right thermomagnetic material 210 can become high permeability. In the next step, the flow controller 300 can guide and distributes a more portion of the cold water to the left thermomagnetic generator 200 and a less portion of the cold water to the right thermomagnetic generator 200. Therefore, the right thermomagnetic generator 200 mixes the hot water with the less portion of the cold water, in which this mixed water reaches a relatively high temperature, so that the right thermomagnetic material 210 can become low permeability; the left thermomagnetic generator 200 mixes the hot water with the more portion of the is cold water, in which this mixed water reaches a relatively low temperature, so that the left thermomagnetic material 210 can become high permeability. Then, the aforesaid steps may be repeated in an iterative manner. Thus, each thermomagnetic generator 200 can be induced to generate power by means of alternate hotter and colder water flowing into the thermomagnetic generator 200.

For example, the thermomagnetic material 210 can be changed into high permeability or low permeability by controlling temperature variation from 10° C. to 15° C. In one embodiment, the first fluid is hot water, and the fluid temperature of the first fluid is 50° C.; the second fluid is cold water, and the fluid temperature of the second fluid is 15° C. The constant flow rate of the hot water is 1 L/sec. The flow controller 300 can guide and distributes a more portion of the cold water to the right thermomagnetic generator 200 and a less portion of the cold water to the left thermomagnetic generator 200, wherein a flow rate of the more portion of the cold water is 4 L/sec, and a flow rate of the less portion of the cold water is 1 L/sec. Alternatively, the flow controller 300 can guide and distributes a more portion of the cold water to the left thermomagnetic generator 200 and a less portion of the cold water to the right thermomagnetic generator 200, wherein a flow rate of the more portion of the to cold water is 4 L/sec, and a flow rate of the less portion of the cold water is 1 L/sec. For each thermomagnetic generator 200, the flow rate of the hot water being 1 L/sec is constant, and therefore the temperature of the mixed water can become 32.5° C. when the flow rate of the cold water is 1 L/sec, alternatively, the temperature of the mixed water can become 22° C. when the flow rate of the is cold water is 4 L/sec. Thus, the thermomagnetic material 210 can be changed into high permeability or low permeability due to the sufficient temperature variation that is about 10.5° C.

Figure 9:
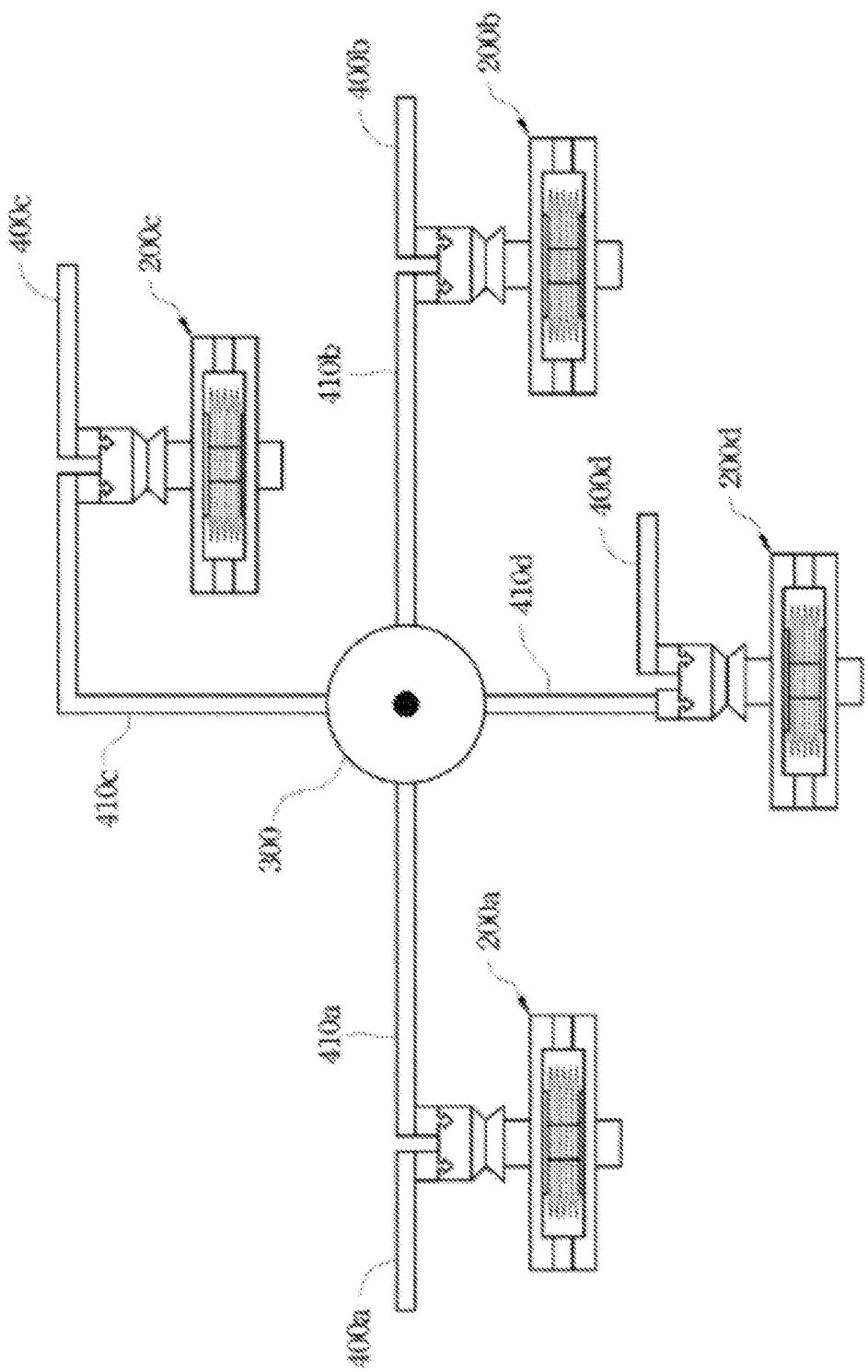
FIG. 9 is a schematic diagram of a second exemplary power generation device according to another aspect of the present disclosure.

Furthermore, one flow controller 300 may be associated with two or more thermomagnetic generators. Refer to FIG. 9. FIG. 9 is a schematic diagram of a second exemplary power generation device according to another aspect of the present disclosure. As shown in FIG. 9, this power generation device includes a flow controller 300, four thermomagnetic generators 200a, 200b, 200c and 200d, four first fluid conduits 400a, 400b, 400c and 400d, and four second fluid conduits 410a, 410b, 410c and 410d. In use, the first fluid conduits 400a, 400b, 400c and 400d deliver the first fluids to the thermomagnetic generator 200a, 200b, 200c and 200d respectively. The controller 300 can control the second fluids flowing into some thermomagnetic generators and adjust flow rates of the second fluids flowing into these thermomagnetic generators respectively.

For example, the flow controller 300 can let the second fluids flow into the thermomagnetic generator 200a and 200b via the second fluid conduits 400a and 400b and adjust the flow rates of the second fluids flowing into the respective thermomagnetic generators 200a and 200b; alternatively, the flow controller 300 can let the second fluids flow into the thermomagnetic generator 200c and 200d via the second fluid conduits 400c and 400d and adjust the flow rates of the second fluids flowing into the respective thermomagnetic generators 200c and 200d.

The design of the thermomagnetic generator is a central aspect of a thermomagnetic power generation device, and many designs have been proposed previously. A central aspect is the inclusion of a thermomagnetic material, which in the present case can be a perovskite manganese oxide material described herein. Each of the thermomagnetic generators can further include at least one magnet and at least one yoke. The magnet, the yoke and the thermomagnetic material constitute a closed magnetic circuit. The magnet can be a permanent magnet or an electric magnet. A number of thermomagnetic generator designs have been proposed in the literature. Examples include those described in international publication WO 2008/116792 A1 WO 2010/034641 A1 WO 2014/187915 A1 WO 2010/076218 A1 WO 2010/026260 A2, and U.S. Pat. No. 8,729,718, the contents of which are incorporated by reference. In various aspects, the thermomagnetic generator is one described in the above-referenced publications except where the thermomagnetic material has been replaced with a perovskite oxide material described herein.

Returning now to FIG. 8, in exemplary aspects the thermomagnetic generators 200 includes a thermomagnetic material 210, a coil 220 and a fluidic mixer 230. The thermomagnetic material 210 is or includes a perovskite manganese oxide material described herein. The coil 220 surrounds the thermomagnetic material 210. The fluidic mixer 230 mixes a first fluid with the second fluid and outputs the mixed fluid to the thermomagnetic material 210. For example, in some aspects the fluidic mixer 230 can be a length of piping where the first and second fluids flow together.

Figure 10A:
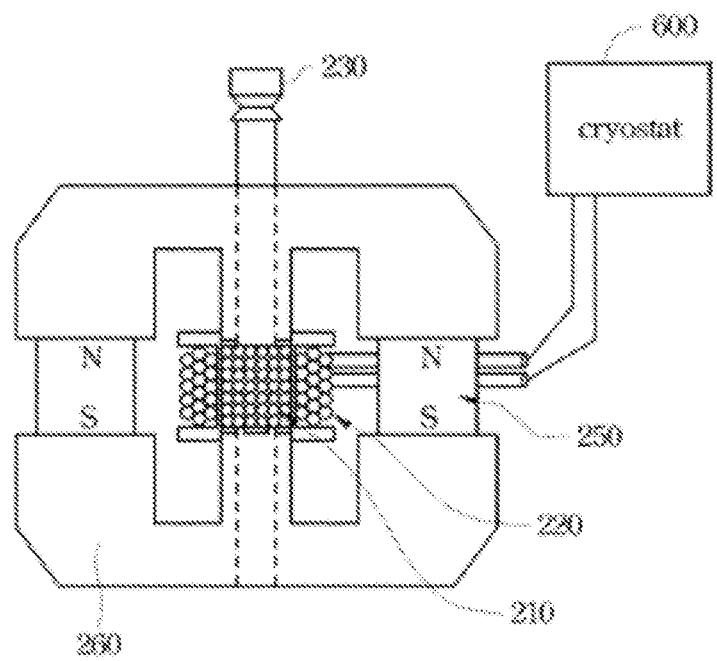
FIG. 10A is a schematic diagram of a thermomagnetic generator of FIG. 8 according to one aspect of the present disclosure.

FIG. 10A is a schematic diagram of an exemplary thermomagnetic generator 200 of FIG. 8 according to one aspect of the present disclosure. As shown in FIG. 10A, the thermomagnetic generator 200 includes two separate magnets 250 and two separate yokes 260. In a magnetic path, the two magnets 250 and the thermomagnetic material 210 are disposed between the two yokes 260. The opposing sides of each of the two yokes 260 are connected to the two magnets 250 respectively, and a central part of each of the two yokes 260 is connected to the thermomagnetic material 210. Therefore, the magnets 250, the yokes 260 and the thermomagnetic material 210 constitute a closed magnetic circuit. Thus, the magnetic line of force is created along the closed magnetic circuit, so that magnetic energy is sufficiently utilized for increasing the power generation efficiency of the thermomagnetic generator.

In FIG. 10A, the coil 220 may be a superconducting coil for reducing transmission loss. The thermomagnetic generator 200 may include a cryostat 600. In use, the cryostat 600 adjusts a temperature of the superconducting coil, so that the superconducting coil can be maintained at ultra-low temperature. Thus, the superconducting coil at ultra-low temperature has very small resistance or approximately zero-resistance.

Figure 10B:
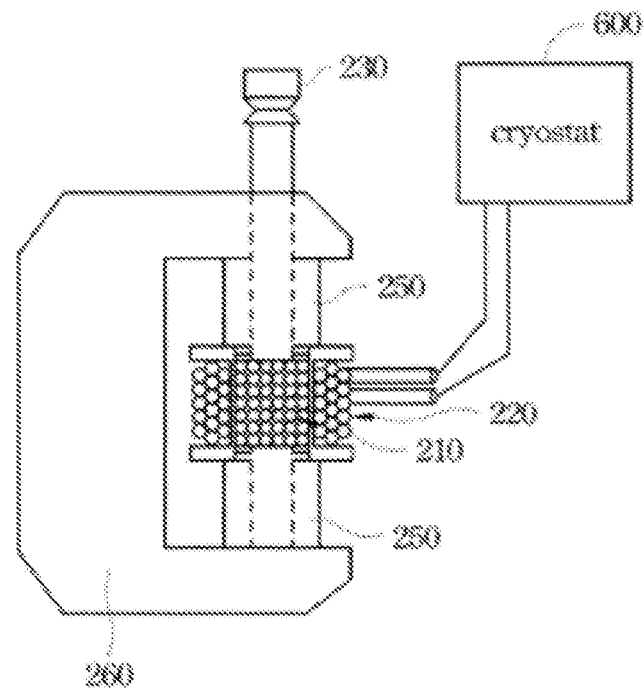
FIG. 10B is a schematic diagram of a thermomagnetic generator of FIG. 8 according to another aspect of the present disclosure.

FIG. 10B is a schematic diagram of a thermomagnetic generator of FIG. 8 according to another embodiment of the present disclosure. As shown in FIG. 10B, the thermomagnetic generator 200 includes two separate magnets 250 and a single yoke 260. The two magnets 250 are connected to opposing sides of the thermomagnetic material 210 respectively, and two ends of the yoke 260 clamp and are connected to the two magnets 250 respectively. Therefore, the magnets 250, the yoke 260 and the thermomagnetic material 210 constitute a closed magnetic circuit. Thus, the magnetic line of force is created along the closed magnetic circuit, so that magnetic energy is sufficiently utilized for increasing the power generation efficiency of the thermomagnetic generator.

In FIG. 10B, the coil 220 can be a superconducting coil for reducing transmission loss. The thermomagnetic generator 200 can include a cryostat 600 for maintaining the superconducting coil at a low temperature.

Moreover, the form of the thermomagnetic material 210 may be a plurality of pellets or masses. The fluid can flow through small opening or space between these pellets or masses. For avoiding that the fluid containing impurity adversely affects the thermomagnetic material 210, the surface of the thermomagnetic material 210 may be coated with a protective film; alternatively, the thermomagnetic material 210 is disposed within the sealed container, and therefore the fluid flows to the sealed container without affecting the thermomagnetic material 210.

In industrial processes, waste heat or used heat usually is released into ambient environment without further use. For efficiently utilizing waste heat, an exhaust heat recovery unit can be used for exhaust heat recovery. The exhaust heat recovery unit can be used to provide a heat source for a power generation device provided herein. In other aspects, the first fluid may be heated by means of terrestrial heat, so as to provide hotter fluid for the thermomagnetic generator.

Refrigeration Devices Including Perovskite Manganese Oxides and Methods of Use Thereof In various aspects, refrigeration devices are provided including a perovskite manganese oxide described herein. The perovskite manganese oxide described herein can exhibit a strong magnetocaloric effect, even at or near room temperature and/or with lower strength magnets that conventional magnetocaloric materials, which can make the particularly useful for refrigeration applications. Perovskite manganese oxide materials described herein, e.g. those having a large magnetocaloric effect, can be utilized as heat and magnetic refrigerators, which compared with the conventional vapor-cycle refrigerator, is environmentally benign and has a number of advantages which include high efficiency, low mechanical vibration and compact size.

A magnetic refrigerator is composed mainly by an active magnetic regenerator (AMR), a magnetic field generator and a flow distribution system. Other components can include the heat exchangers, electrical motor and control system. A central aspect of the active magnetic regenerator is the inclusion of a thermomagnetic material, which in the present case can be a perovskite manganese oxide material described herein.

Magnetic refrigerators can be classified as reciprocating or rotary. Magnetic refrigerators can also be classified according to the magnetic field change generation which can be performed by three different configurations: a stationary regenerator with a moving magnetic circuit, a stationary magnetic circuit with a moving regenerator or a pulsed field stationary regenerator using an electromagnetic or superconducting coil.

Normally, a reciprocating AMR has a stationary regenerator with one bed such as that described in Trevizoli et al., *Int. J. of Refrigeration*, 34, 1518-1526, 2011; two beds such as that described by Tura and Rowe in *Int. J. of Refrigeration*, 34, 628-639, 2011, or many beds such as those described by Kawanami in *Int. J. of Refrigeration*, 29, 1294-1301, 2006. Reciprocating AMR designs can include those described by Bahl et al., *Rev. of Scientific Instruments*, v79, 2008. Rotary AMR designs have also been made with multiple stationary beds and rotating magnets by Okamura et al. (*Int. J. of Refrigeration*, 29, 1327-1331, 2006). Rotary regenerators with stationary magnet have been shown to operate effectively at higher cycle frequencies by Zimm et al (*Int. J. of Refrigeration*, 29, 1302-1306, 2006), Tu˘sek et al. (*Int. J. of Refrigeration*, 33, 294-300, 2010), Engelbrecht et al. (*Int. J. of Refrigeration*, 35, 1498-1505, 2012). Furthermore, the use of AMRs with an electromagnetic coil has been demonstrated by Yu et al. .(*Mat. Lett.*, 45, 91-442006) or with a superconducting. The contents of all of the above are incorporated by reference in their entirety.

The AMR can include any of the above AMR structures where the magnetic refrigerant is replaced with the perovskite manganese oxide particles described herein, e.g. as opposed to the Gd commonly used in many of these systems. The bed geometry can include packed spheres containing the perovskite manganese oxide, packed particles containing the perovskite manganese oxide, or parallel plates that can be coated with the perovskite manganese oxide or that can encase the perovskite manganese oxide.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Perovskite magnanite $La_{0.6}Ca_{0.4}MnO_3$ (LCMO) nanomaterials were synthesized by a modified Pechini sol-gel process followed by high temperature sintering. Polyethylene glycol of various molecular weights were used to control the particle size and morphology of the materials. XRD along with Scherrer analysis were used to confirm the crystal structure and crystallite size of the LCMO nanomaterials. The LCMO nanomaterials showed a paramagnetic to ferromagnetic transition at 277 K. The maximum change in entropy was calculated to be 19.3 $Jkg^{-1}K^{-1}$ for a field change of 0-3 T and 8.7 $Jkg^{-1}K^{-1}$ for a field change of 0-1 T, relative cooling power was determined to be 627 $J\ kg^{-1}$. The $La_{0.6}Ca_{0.4}MnO^3$ shown in this work have demonstrated an enhanced magnetocaloric effect compared to the current literature. These results showed that the LCMO nanomaterials to be an excellent candidate for magnetic refrigeration applications as they are less costly in comparison to Gd based compounds.

Experimental Section

Materials and Methods

All reagents, lanthanum (III) nitrate hydrate (Alfa Aesar, 99%), calcium carbonate (Aldrich), manganese (II) acetate hydrate (Acros Organics, 99%), citric acid (VWR, ACS grade), polyethylene glycol 600, 2000 (Aldrich), 4000 (TCI America), and nitric acid (Fischer) were used with any further purification.

$La_{0.6}Ca_{0.4}MnO_3$ nanomaterial was prepared by a modified Pechini sol-gel method. In a typical reaction, 2.6 g of $La(NO_3)\ xH_2O$, 0.4 g of $CaCO_3$, and 2.5 g of $Mn(CH_3COO)_2\ 4H_2O$ were used as metal precursor. Along with the metal salt, 0.5 g citric acid, and 0.5 g of various molecular weight polyethylene glycol (PEG) were dissolved in a 4 M nitric acid solution. The solution was heated to 70° C. for 6 hours for the polymerization of the gel. The solution turns golden yellow initially and lighten to a pale yellow gel after 6 hours. The resulting gel was calcinated at 900° C. to obtain the final black product.

Characterization

Crystal phase identification was performed using PANalytical MPD X'Pert Pro x-ray diffractometer (Cu K$\alpha_1$=1.54 Angstroms), the X-ray diffraction (XRD) patterns were analyzed using X'Pert HighScore Plus. Scanning electron microscopy (SEM) was completed on Hitachi SU-70 FE-SEM operating at 5 keV. Samples were prepared using colloidal graphite paste and sputtered with platinum. Magnetic characterization was performed using Quantum Design Versalab physical property measurement system. Field cooled (FC) and zero field cooled (ZFC) magnetization (M-T) curve was measured from 50-400 K in 100 Oe external field. The temperature and field dependence of magnetization was measured from 50-300 K with a temperature increment of 5 K. Far-IR spectroscopy was performed using Nicolet Advanced iS50 FT-IR with ATR attachment.

Results and Discussion

As mentioned previously, LCMO nanomaterials were synthesized using a modified sol-gel method by changing the chain length of the PEG polymer. It is well known that the presence of PEG in the sol-gel process assists in the polymerization of the gel as well as acts as a stabilizer and capping agent in particle formation.[11] XRD phase characterization was performed for all LCMO samples as shown in FIG. 1. All samples yield 100% of orthorhombic perovskite crystalline crystal structure as represented in FIG. 1 for the LCMO synthesized using various PEG. Crystallite size of each sample was calculated using the Scherrer equation using the highest intensity peak at 32.9 2-theta. The crystallite sizes were determined to be 62.3, 33.8, and 57.1 nm for LCMO synthesized using PEG 600, 2000, and 4000 respectively. The LCMO synthesized using PEG 600 and 4000 resulted in larger crystallite size (~60 nm) in comparison of the sample synthesized using PEG 2000. The morphology of all LCMO nanocomposites were examined under SEM analysis demonstrated in FIGS. 2A-2I. The LCMO synthesized with PEG 2000 shows a lack of distinct particles and appears to be agglomerated. However, the LCMO particles obtained using PEG 600 and 4000 shows well defined particles with less agglomeration. In addition, TEM images shows similar morphologies for the three samples. Particles synthesized using PEG 600 consist of 42±16 nm particles, whereas particles synthesized using PEG 2000 and PEG 4000 result in similar size particles; 67±35 nm and 71.2±41 nm respectively. The observed particle size and calculated crystallite size from XRD patterns are in disagreement, suggesting polydispersity or agglomeration in particle distribution within the samples. The particles synthesized using PEG 600 appears to be the smallest of the three samples. It is due to the shorter PEG chain length provide better encapsulation during the gelation process, resulting in smaller particles. Observations of the SEM along with TEM micrographs suggests that 42 nm particles synthesized using PEG 600 give rise to higher performance as a magnetocaloric material.

Figure 3A:
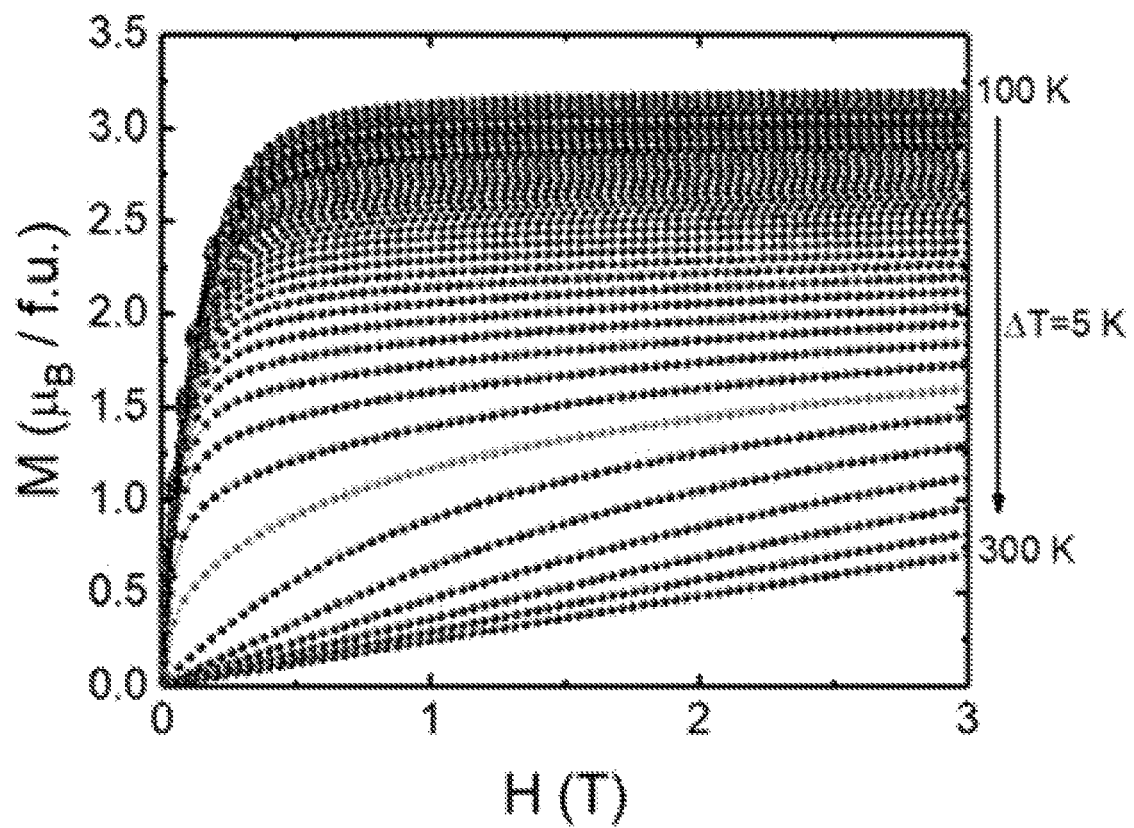
FIGS. 3A-3B show isothermal magnetization (M-H) measured from 100-300 K (FIG. 3A) PEG 600, (FIG. 3B) PEG 2000, (FIG. 3C) PEG 4000.
Figure 3B:
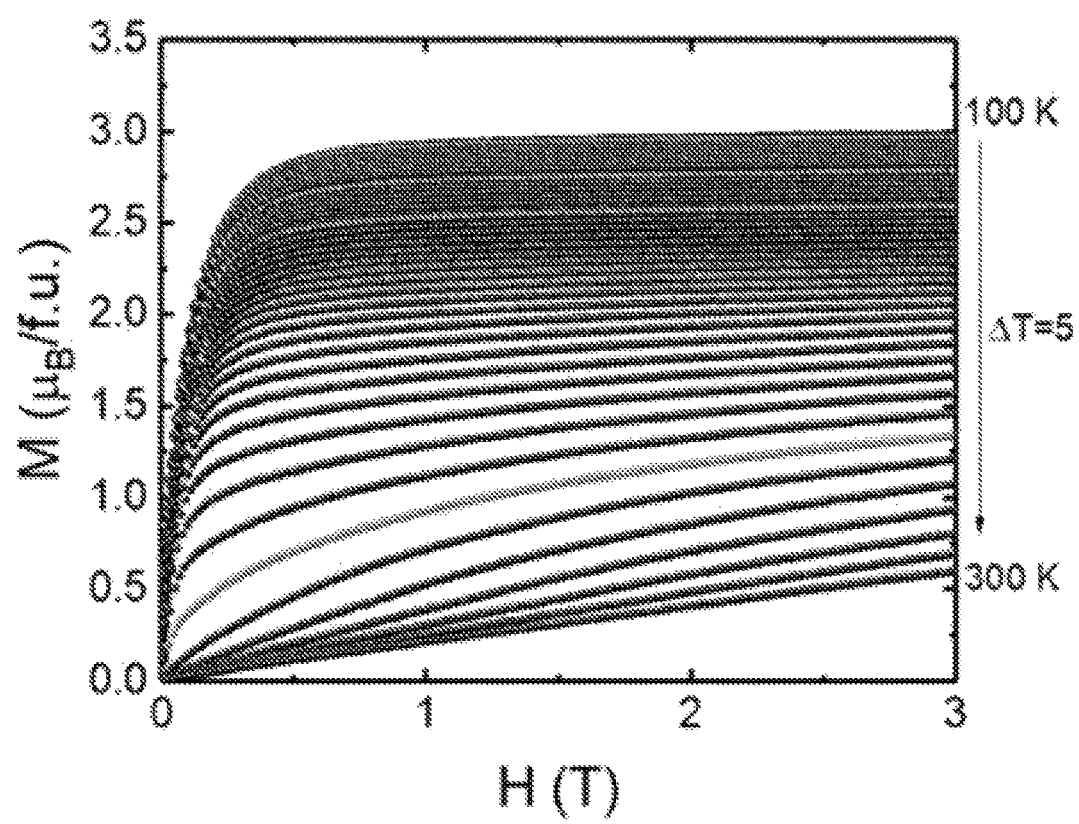
Figure 3C:
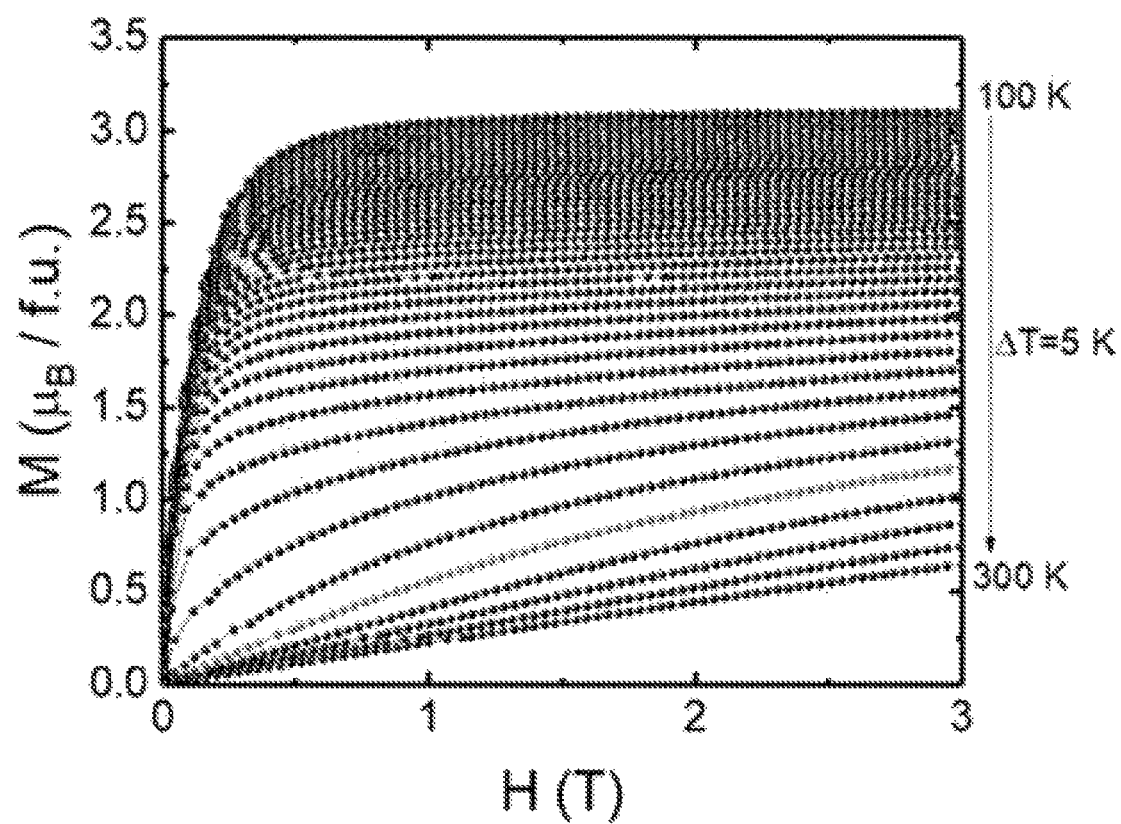
Figure 4A:
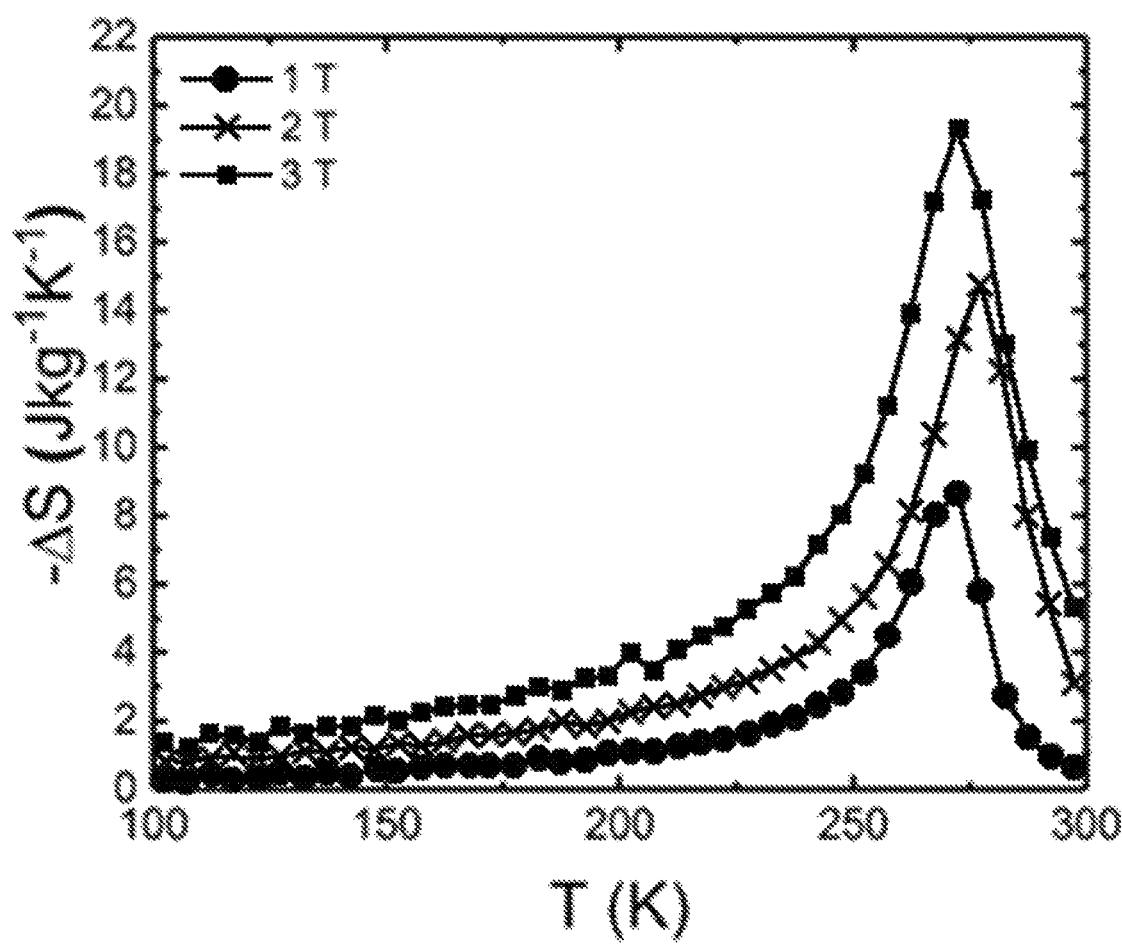
FIGS. 4A-4C show temperature dependence of change in magnetic entropy of the as-synthesized $La_{0.6}Ca_{0.4}MnO_3$ calculated at various external field (FIG. 4A) PEG 600, (FIG. 4B) PEG 2000, (FIG. 4C) PEG 4000.
Figure 4B:
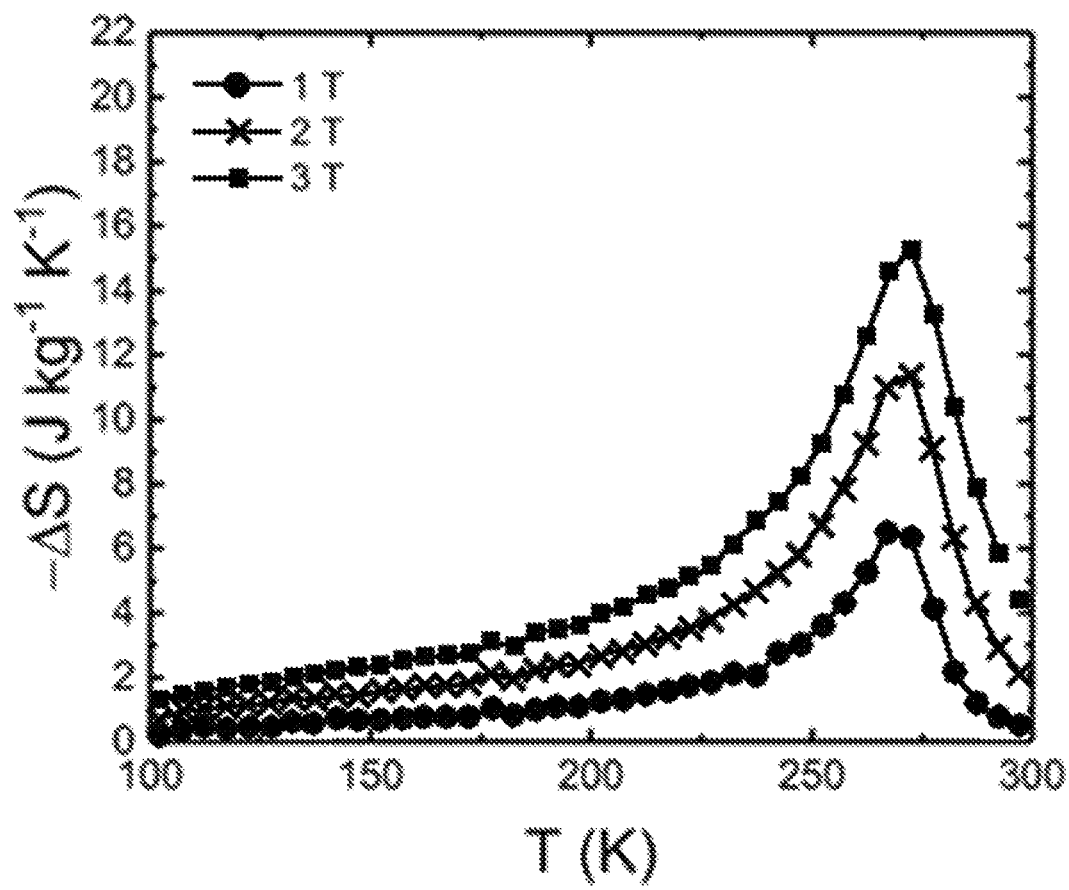
Figure 4C:
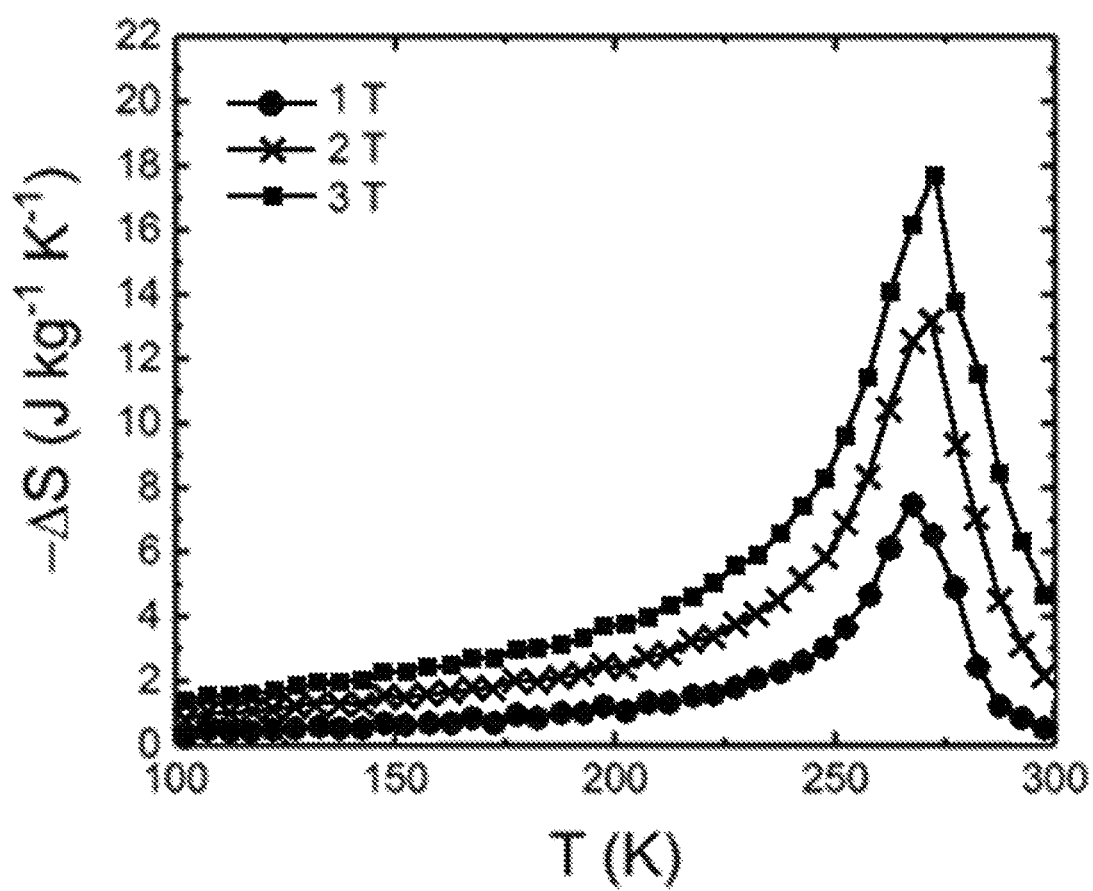
Figure 5A:
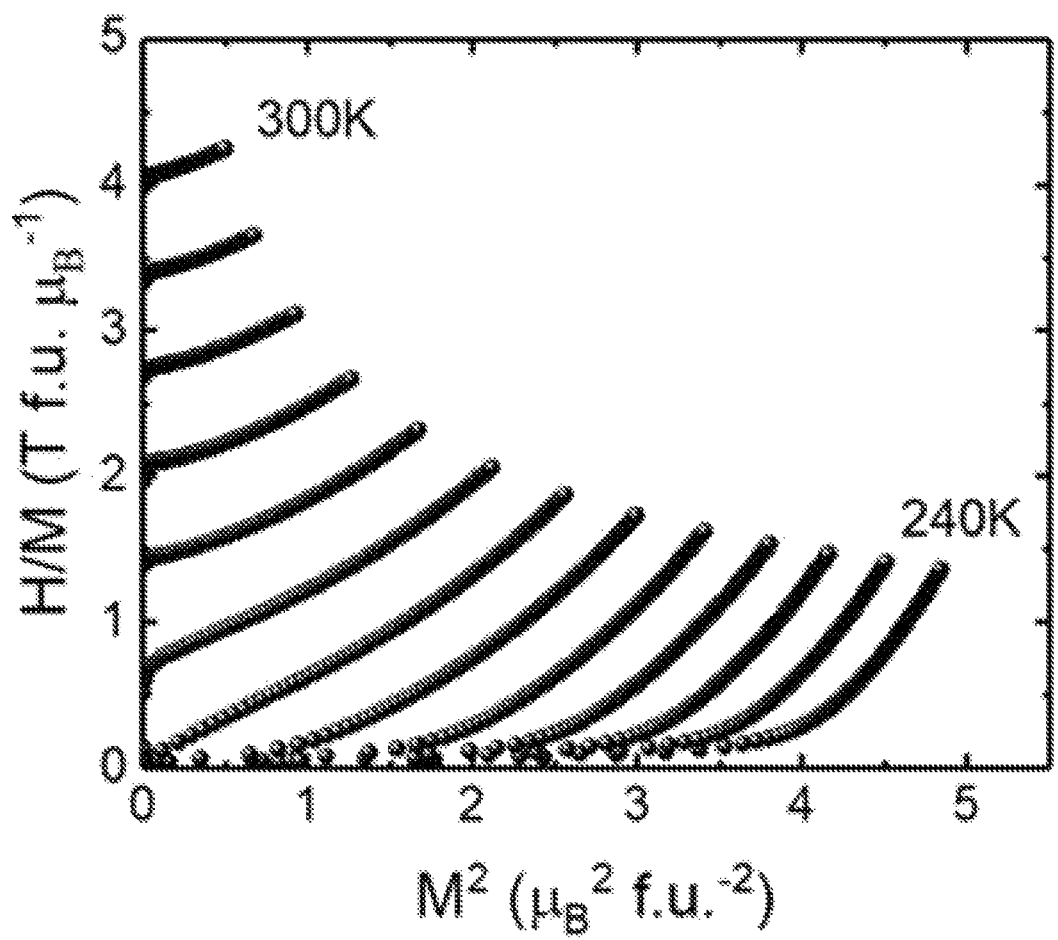
FIGS. 5A-5C show Banerjee plots of the LCMO sample synthesized using (FIG. 5A) PEG 600, (FIG. 5B) PEG 2000, (FIG. 5C) PEG 4000.
Figure 5B:
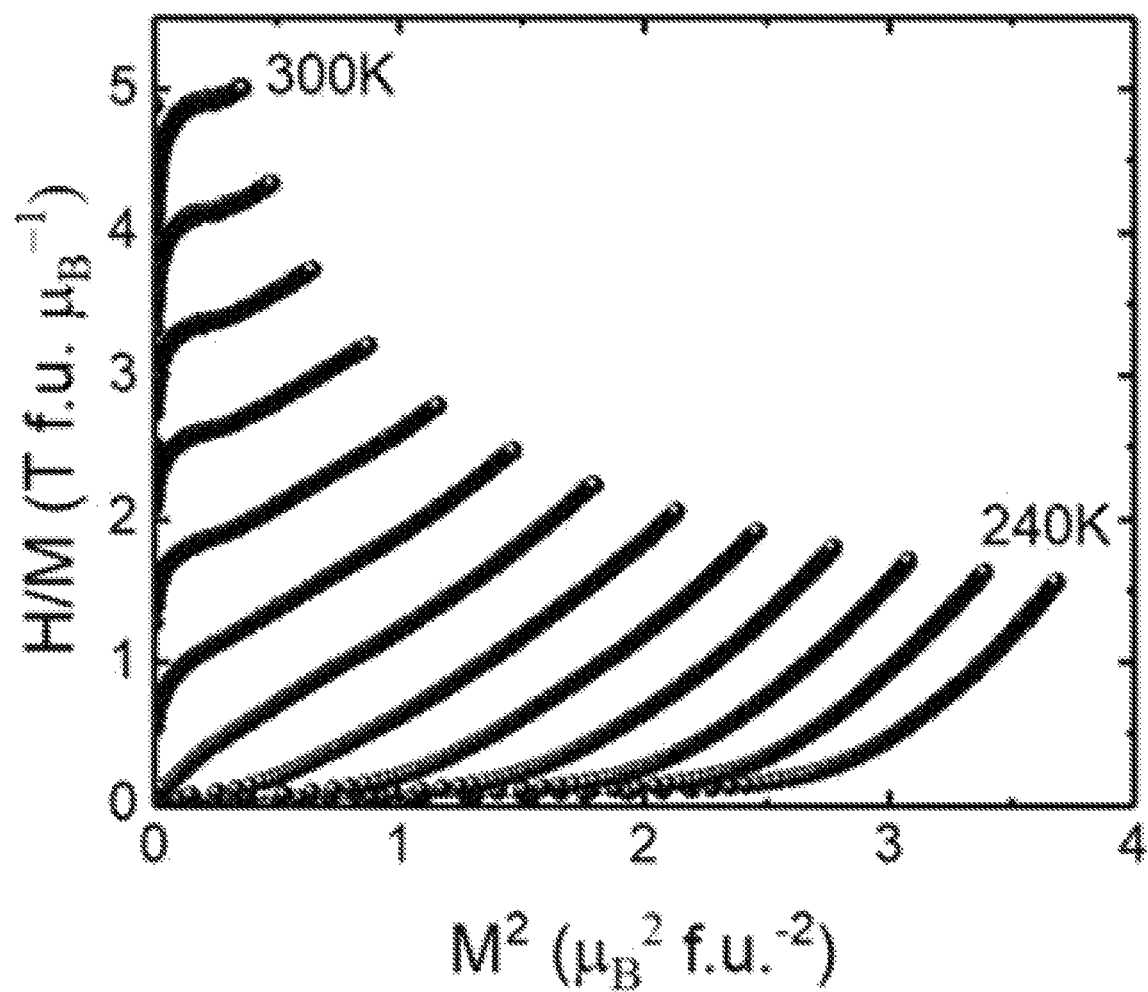
Figure 5C:
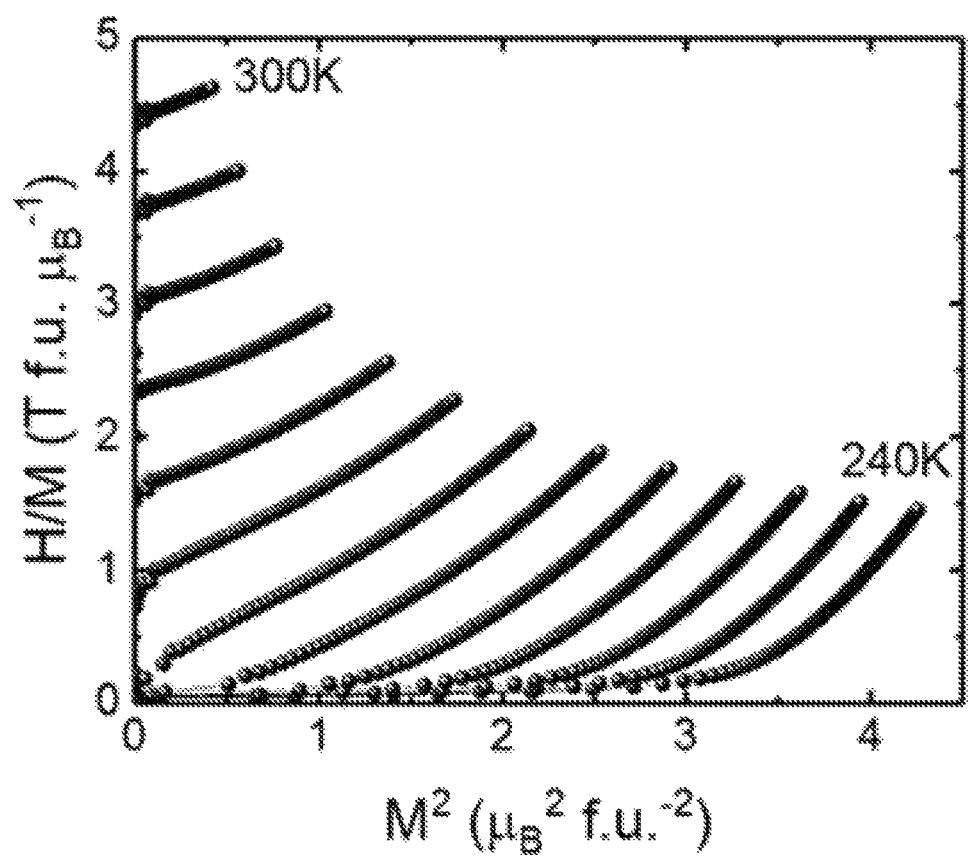

The magnetic properties of the LCMO nanomaterials, the temperature and field dependence magnetization up to 3 T was measured using a commercial VSM. In order to study the magnetic properties of the LCMO nanomaterials, M-H curves at 5 K interval were obtained in order to calculate the change in magnetic entropy with respect to the temperature. The isothermal magnetization (M-H) curves shown in FIGS. 3A-3C were measured by warming the sample from 100 to 300 K in 5 degree increments. FIGS. 4A-4C shows the change in magnetic entropy ($-\Delta S_M$) for the LCMO samples calculated using eq 1 and FIGS. 3A-3C. As indicated in FIGS. 4A-4C, the overall maximum entropy increases as the external field increases. In addition, FIGS. 4A-4C reveals that the LCMO sample synthesized using PEG 600 and 4000 result in the high $-\Delta S_M$ values of 19.3 Jkg$^{-1}$K$^{-1}$ and 17.7 Jkg$^{-1}$K$^{-1}$ at 3 T. Banerjee criterion plot was used to evaluate the order magnetic transition. This was achieved by plotting H/M vs M$^2$ near the transition region shown in FIGS. 5A-5C. In the sample synthesized using PEG 600 and PEG 4000, there is a slight sign of a second order magnetic transition for these two samples whereas particles synthesized using PEG 2000 showed a weak first order transition. Previous studies suggested that LCMO materials exhibit a change from first order magnetic transition to second order magnetic transition as the size of the particles decreases.[12, 13] Based on the TEM results presented, particles synthesized using PEG 2000 appears to be agglomerated, resulting in a bulk like behavior in comparison to the particles synthesized using PEG 600 and 4000.

Figure 6A:
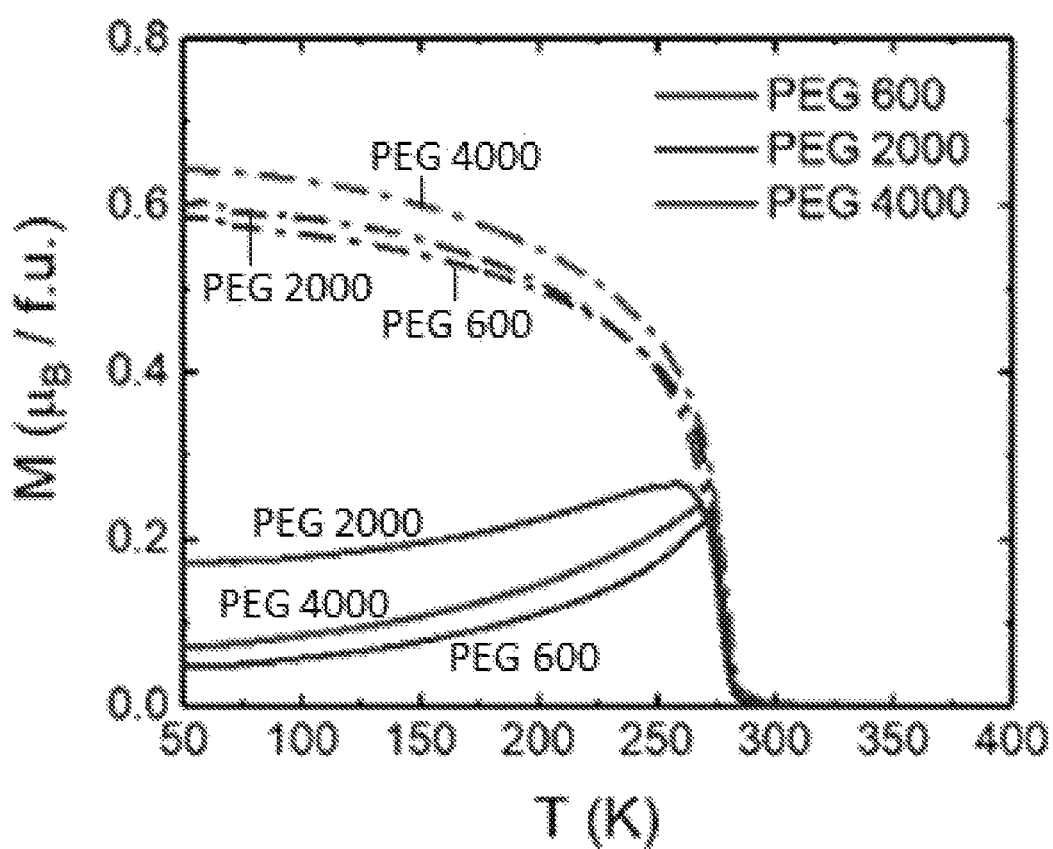
FIGS. 6A-6B show (FIG. 6A) M-T curves for the as-synthesized LCMO at 100 Oe applied field for ZFC (solid line) and FC (dash), (FIG. 6B) calculated RCP values.
Figure 6B:
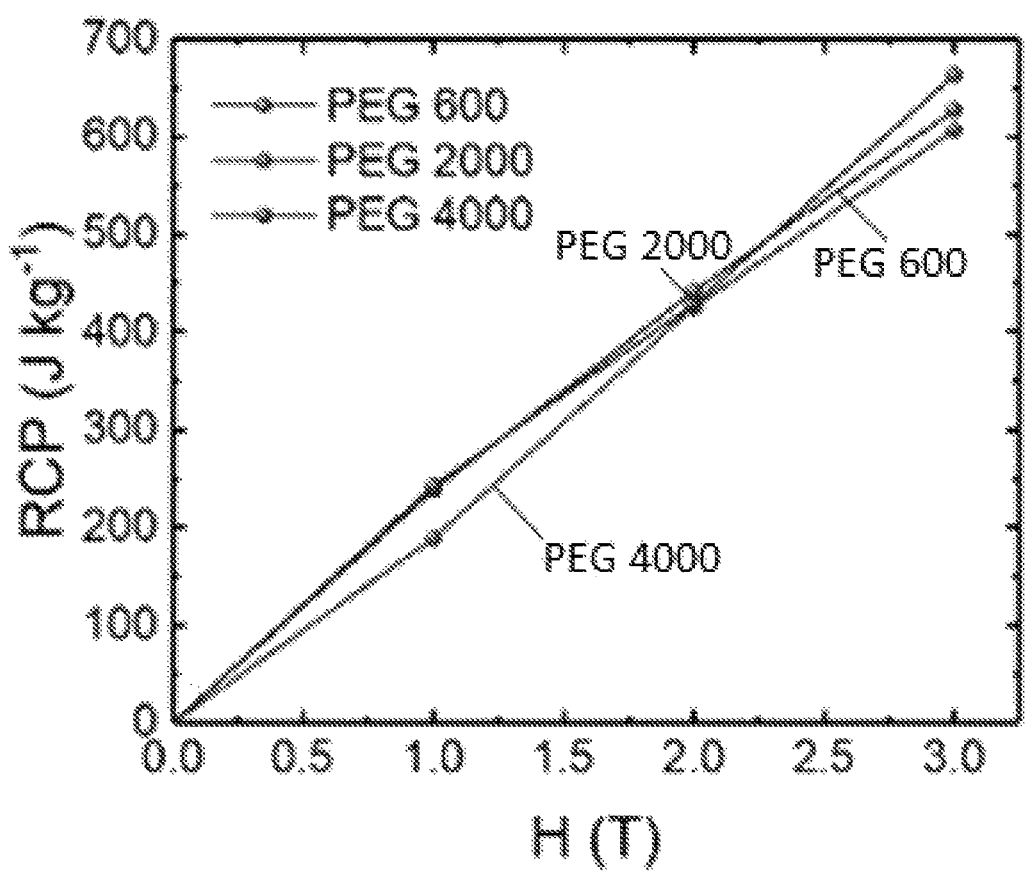

Relative cooling power (RCP) is used to measure the maximum entropy change in an ideal refrigeration cycle and is obtained by multiplying the maximum change in entropy $(-\Delta S_M)$max by the change in temperature at full width half maximum ($\delta T_{FWHM}$) of the $-\Delta S_M$-T curve.[1] The RCP calculated for each sample is demonstrated in FIG. 6B, it reveal that the RCP increases as the PEG chain length increases.

Figure 7A:
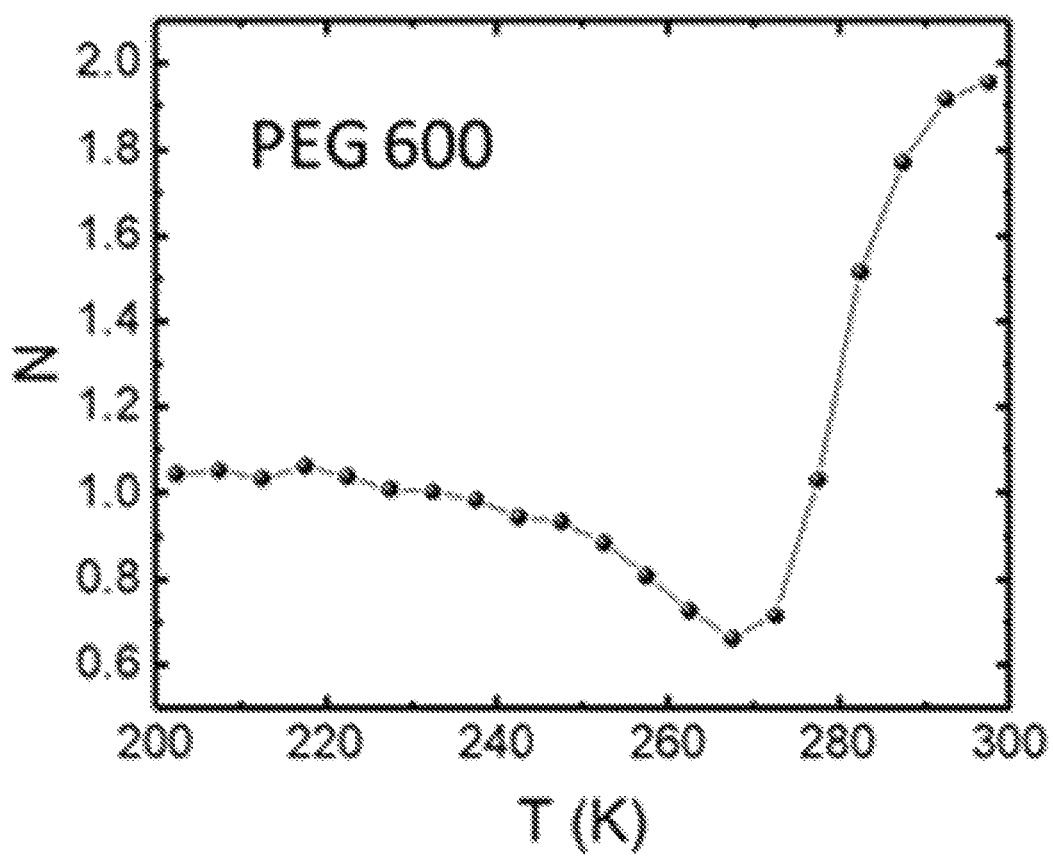
FIGS. 7A-7C show temperature variation in the N exponent for the LCMO manganites.
Figure 7B:
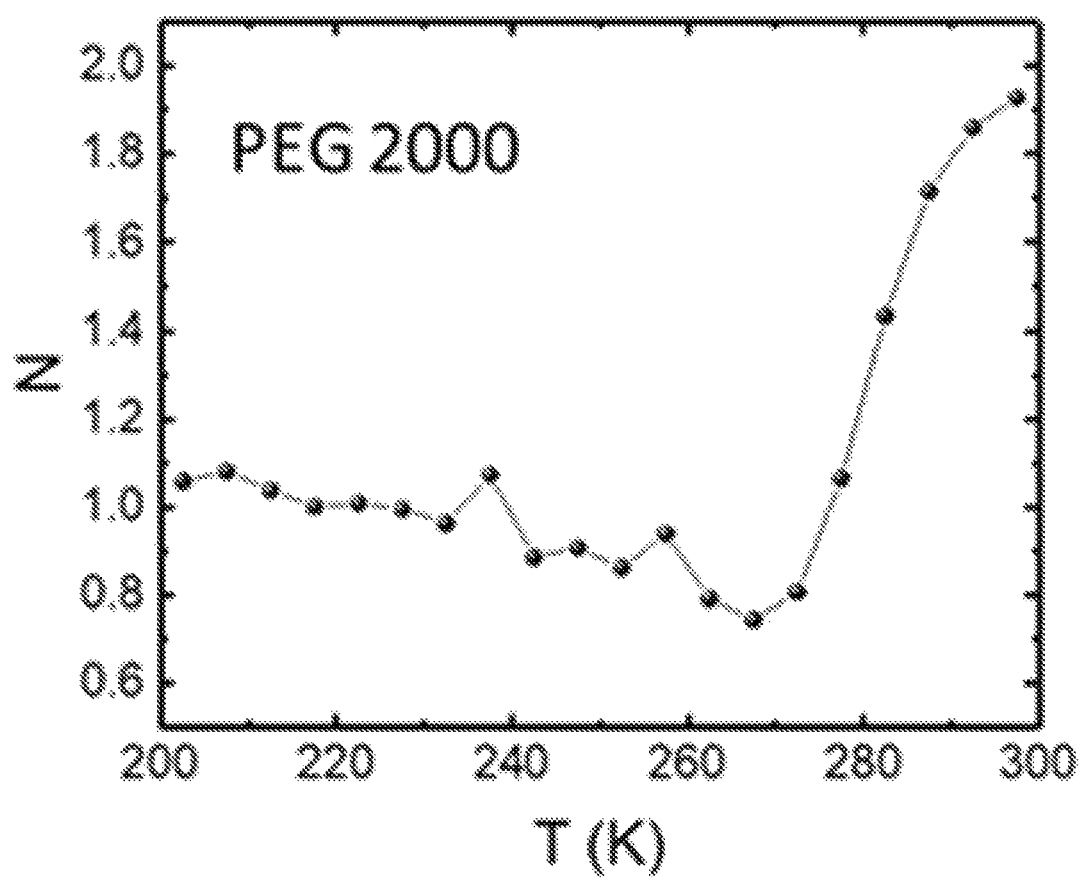
Figure 7C:
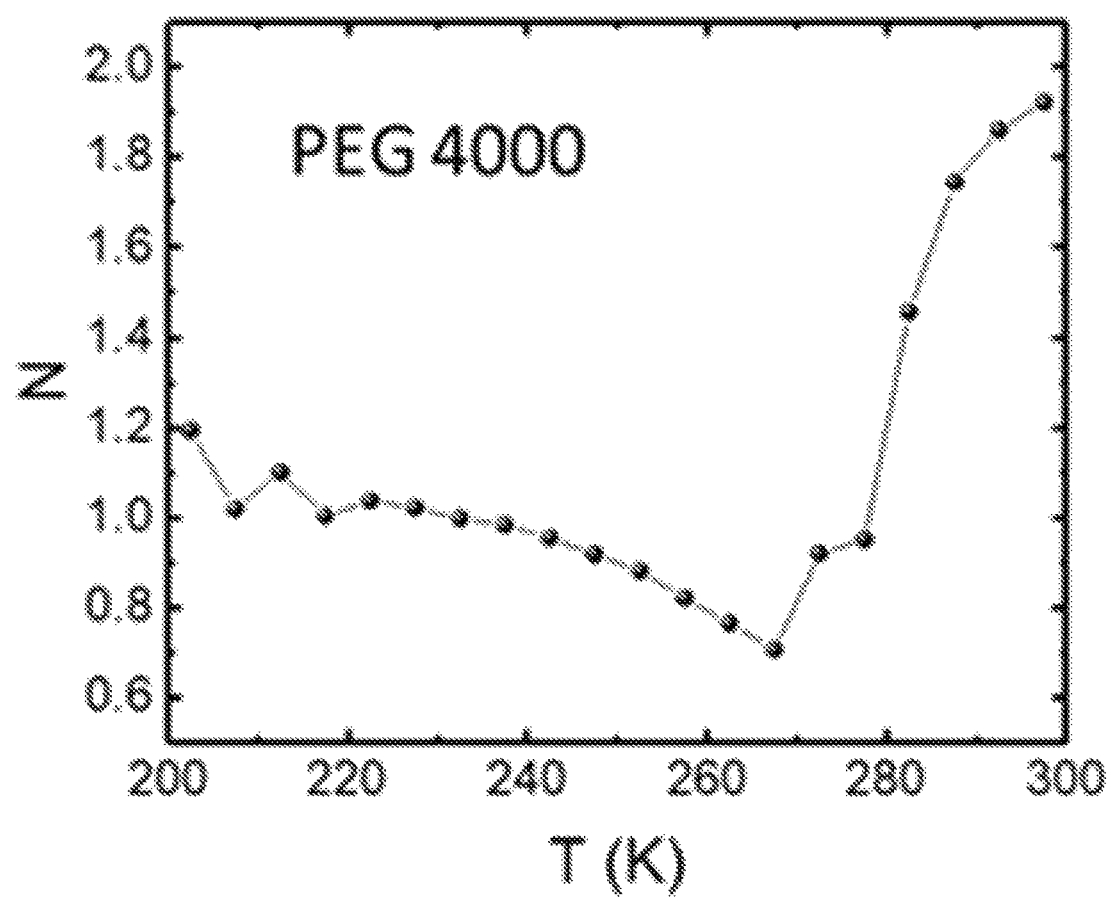

The field dependence of $\Delta S$ for the LCMO manganite at a fixed temperature is accounted for in the N component of the power law $\Delta S_M(H) \propto H^N$. The temperature variation of in the N component for the LCMO are shown in FIGS. 7A-7B. Due to our instrument limitations, the magnetization isotherms were only measured up to 3T. Therefore the N component of the power law is an approximation between 0-3T. The minimum N values for PEG 600, 2000, and 4000 were found to be 0.66, 0.74 and 0.71 respectively. In all three samples, the N values showed significant differences between the ferromagnetic and paramagnetic phase of the material. The shape of the N(T) behaves similarly to the polycrystalline samples in the literature.[14] The sample synthesized using PEG 600 have an N(T) value of 0.66, which was predicted at Curie temperature using the mean field approach.[15]

In LCMO materials, the FM-PM transition is due to double exchange between the Mn$^{3+}$ and Mn$^{4+}$ that causes a spin coupling interaction resulting in Jahn-Teller distortion.[16] In addition, lattice distortions can be observed using Far-IR spectroscopy as phonon modes within the LCMO system are infrared active.[17] Room temperature Far-IR spectroscopy results indicated two major peaks at 549 cm$^{-1}$ and 275 cm$^{-1}$ for the LCMO synthesized using PEG 600, these peaks are associated with the stretching and bending modes of Mn—O—Mn bond.[17] However, in the Far-IR spectra for PEG 2000 sample, the stretching mode shift to a lower wavenumber indicating that there is a bond angle and distance change between the samples. This suggest that the energy associated with the PEG 2000 sample is lower than that of the PEG 600 and 4000 samples resulting in the increase in magnetic entropy. Since the crystallites synthesized using PEG 600 and PEG 4000 resulted in larger crystallite sizes (>60 nm) in comparison to PEG 2000, the Far-IR spectra could explain the cause of enhanced magnetic entropy in larger crystallite size materials in comparison to smaller crystallites, where the Mn—O—Mn bond energy is higher in comparison to smaller crystallites. In addition, particles synthesized using PEG 600 and 4000 appeared to be less agglomerated in comparison to particles synthesized using PEG 2000. Lampen et al. suggested that in nanoparticle systems the second order magnetic transition is strongly due to surface effects of the particles.[13] This suggested that the synthesis parameter and particle morphology effect the surface induced properties of the materials. Which explained the second order magnetic transition behavior of the particles synthesized using PEG 600 and 4000 as they exhibit particle like morphology where surface effect are dominant in comparison to larger, more agglomerated samples.

In comparison to the commonly used materials for magnetic refrigeration applications (Table 1), the $La_{0.6}Ca_{0.4}MnO_3$ in this work showed an enhancement in the magnetocaloric properties of current LCMO materials. Though the $T_C$ of the LCMO nanocomposites are lower than that of Gd based material, the magnetic entropy is large enough to be used for magnetic refrigeration applications as the cost of LCMO production is significantly lower than Gd based materials.

TABLE 1

Comparison of magnetocaloric effects in selected materials

| Sample | $|(\Delta S_M)_{max}|$ (J kg$^{-1}$ K$^{-1}$) | $T_c$ (K) | RCP (J kg$^{-1}$) | Ref |
|---|---|---|---|---|
| $La_{0.5}Ca_{0.5}MnO_3$ | 1.2 (2 T) | 210 | 93 | 18 |
| $La_{0.6}Ca_{0.4}MnO_3$ | 8.7 (1 T) | 277 | 238 | This work |
| $La_{0.6}Ca_{0.4}MnO_3$ | 19.3 (3 T) | 277 | 627 | This work |
| $La_{0.6}Ca_{0.4}MnO_3$ | 8.3 (5 T) | 270 | 508 | 5 |
| $La_{0.8}Ca_{0.2}MnO_3$ | 8.6 (4.5 T) | 236 | 200 | 19 |
| $LaMnO_3$ | 2.4 (5 T) | 150 | 369 | 20 |
| $La_{0.75}Sr_{0.25}MnO_3$ | 1.6 (1.5 T) | 332 | 64 | 21 |
| Gd | 10.2 (5 T) | 297 | 240 | 22 |
| $Gd_{90}Fe_{5.7}Al_{4.3}$ | 7.2 (5 T) | 279 | 744 | 23 |

In summary, near room temperature magnetocaloric properties were obtained for $La_{0.6}Ca_{0.4}MnO_3$ via a modified sol-gel method. In this study, PEG was shown to control morphology and magnetocaloric properties of the LCMO nanomaterials. The structure and morphology were investigated using XRD, TEM and SEM. Magnetic measurement revealed that the nanoparticles undergo a second order magnetic transition with the PM-FM transition near room temperature. The maximum change in magnetic entropy ($-\Delta S_M$) was found to be 19.3 Jkg$^{-1}$K$^{-1}$ at 278 K for a field change of 0-3 T and 8.7 Jkg$^{-1}$K$^{-1}$ for a field change of 0-1 T. The relative cooling power (RCP) that is used to evaluate magnetic refrigeration properties was determined to be 627 Jkg$^{-1}$. This synthesis method have demonstrated an enhanced magnetocaloric effect comparing to the current LCMO literature. In addition, these material are also comparable to that of Gd based magnetocaloric materials, suggesting that this can be a promising material for magnetic refrigeration application.

REFERENCES

1. M.-H. Phan and S.-C. Yu, J. Magn. Magn. Mater., 2007, 308, 325-340.
2. J. Romero Gómez, R. Ferreiro Garcia, A. De Miguel Catoira and M. Romero Gómez, Renew. Sust. Energ. Rev., 2013, 17, 74-82.
3. V. K. Pecharsky, K. A. Gschneidner, A. O. Pecharsky and A. M. Tishin, Phys. Rev. B, 2001, 64, 144406.
4. A. O. Pecharsky, K. A. G. Jr. and V. K. Pecharsky, J. Appl. Phys., 2003, 93, 4722-4728.
5. V. M. Andrade, R. J. C. Vivas, S. S. Pedro, J. C. G. Tedesco, A. L. Rossi, A. A. Coelho, D. L. Rocco and M. S. Reis, Acta Mater., 2016, 102, 49-55.
6. O. I. Lebedev, G. Van Tendeloo, S. Amelinckx, B. Leibold and H. U. Habermeier, Phys. Rev. B, 1998, 58, 8065-8074.
7. M. Pękała, V. Drozd, J. F. Fagnard, P. Vanderbemden and M. Ausloos, Appl. Phys. A, 2008, 90, 237-241.
8. M.-H. Phan, S.-C. Yu, N. H. Hur and Y.-H. Jeong, J. Appl. Phys., 2004, 96, 1154-1158.
9. H. Gencer, N. E. Cengiz, V. S. Kolat, T. Izgi and S. Atalay, Acta Phys. Pol., A, 2014, 125, 214-216.
10. A. E. Danks, S. R. Hall and Z. Schnepp, Mater. Horiz., 2016, 3, 91-112.
11. X. Wang, M. Wang, H. Song and B. Ding, Mater. Lett., 2006, 60, 2261-2265.
12. L. E. Hueso, P. Sande, D. R. Miguéns, J. Rivas, F. Rivadulla and M. A. López-Quintela, J. Appl. Phys., 2002, 91, 9943-9947.
13. P. Lampen, N. S. Bingham, M. H. Phan, H. Kim, M. Osofsky, A. Piqué, T. L. Phan, S. C. Yu and H. Srikanth, Appl. Phys. Lett., 2013, 102, 062414.
14. M. Pękała, J. Appl. Phys., 2010, 108, 113913.
15. H. Oesterreicher and F. T. Parker, J. Appl. Phys., 1984, 55, 4334-4338.
16. P. Schiffer, A. Ramirez, W. Bao and S. Cheong, Phys. Rev. Lett., 1995, 75, 3336.
17. K. H. Kim, J. Y. Gu, H. S. Choi, G. W. Park and T. W. Noh, Phys. Rev. Lett., 1996, 77, 1877-1880.
18. M. Pękała, V. Drozd, J. F. Fagnard and P. Vanderbemden, J. Alloys Compd., 2010, 507, 350-355.
19. S. Xi, W. Lu and Y. Sun, J. Appl. Phys., 2012, 111, 063922.
20. A. Biswas, S. Chandra, M.-H. Phan and H. Srikanth, J. Alloys Compd., 2012, 545, 157-161.
21. M. Pękała, K. Pękała, V. Drozd, J. F. Fagnard and P. Vanderbemden, J. Magn. Magn. Mater., 2010, 322, 3460-3463.
22. H. Zeng, J. Zhang, C. Kuang and M. Yue, Applied Nanoscience, 2011, 1, 51-57.
23. L. Zhang, M. Bao, Q. Zheng, L. Tian and J. Du, AIP Advances, 2016, 6, 035220.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The present disclosure will be better understood upon review of the following features, which should not be confused with the claims.

Feature 1. A method of making perovskite manganese oxide particles having a strong magnetocaloric effect, the method comprising: forming an aqueous mixture comprising (i) a low-molecular-weight polymeric polyalcohol gel precursor, (ii) a stoichiometric amount of metal salts or hydrates thereof, wherein the metal salts or hydrates thereof comprise at least a Manganese (Mn), and (iii) a polybasic carboxylic acid; polymerizing the aqueous mixture to form a gel comprising perovskite manganese oxide nanoparticles entrapped therein; and calcining the gel to remove at least a portion of organic material in the gel and form the perovskite manganese oxide particles.

Feature 2. The method according to any one of Features 1-17 and 21-28, wherein the low-molecular-weight polymeric polyalcohol gel precursor comprises a low-molecular-weight polyethylene glycol.

Feature 3. The method according to any one of Features 1-17 and 21-28, wherein the low-molecular-weight polymeric polyalcohol gel precursor comprises a low-molecular-weight polyvinyl alcohol.

Feature 4. The method according to any one of Features 1-17 and 21-28, wherein the metal salts or hydrates thereof comprise a metal hydroxide, a metal alkoxide, a metal acetate, a metal chloride, a metal citrate, a metal nitrate, or a combination thereof.

Feature 5. The method according to any one of Features 1-17 and 21-28, wherein the metal salts or hydrates thereof further comprise a metal selected from the group consisting of Lanthanum (La), Cerium (Ce), Praseodymium (Pr), Neodymium (Nd), Gadolinium (Gd), Calcium (Ca), Strontium (Sr), Barium (Ba), and a combination thereof.

Feature 6. The method according to any one of Features 1-17 and 21-28, wherein the perovskite manganese oxide particles comprise a doped manganese oxide; wherein the metal salts or hydrates thereof further comprise a trivalent rare-earth metal and a divalent metal; and wherein a molar ratio of a first total amount of Mn to a second total amount of trivalent rare-earth metal and divalent metal in the aqueous mixture is about 1.

Feature 7. The method according to any one of Features 1-17 and 21-28, wherein the perovskite manganese oxide particles comprise $La_{1-x}Ca_xMnO_3$, wherein x is about 0.1 to 0.5; and wherein the metal salts or hydrates thereof further comprise La and Ca.

Feature 8. The method according to any one of Features 1-17 and 21-28, wherein the perovskite manganese oxide particles comprise $La_{1-x}Sr_xMnO_3$, wherein x is about 0.1 to 0.5; and wherein the metal salts or hydrates thereof further comprise La and Sr.

Feature 9. The method according to any one of Features 1-17 and 21-28, wherein the polybasic carboxylic acid is selected from the group consisting of citric acid, glycolic acid, tartaric acid, maleic acid, hydroxymaleic acid, hydroxytartaric acid, malonic acid, malic acid, lactic acid, tartronic acid, gluconic acid, saccharic acid, glucuronic acid, mucic acid, mannosaccharic acid, and a combination thereof.

Feature 10. The method according to any one of Features 1-17 and 21-28, wherein the low-molecular-weight polymeric polyalcohol gel precursor is present in the aqueous mixture at a weight ratio (w/w) of the low-molecular-weight polymeric polyalcohol gel precursor to the metal of about 1:10.

Feature 11. The method according to any one of Features 1-17 and 21-28, wherein each of the metal salts or the hydrate thereof is present in the aqueous mixture at a concentration of about 0.1 M to 1.0 M.

Feature 12. The method according to any one of Features 1-17 and 21-28, wherein the polybasic carboxylic acid is present in the aqueous mixture at a weight ratio (w/w) of the polybasic carboxylic acid to the metal of about 1:10.

Feature 13. The method according to any one of Features 1-17 and 21-28, wherein the polymerizing step comprises one or both of (i) lowering the pH of the aqueous mixture by the addition of an acid and (ii) heating the aqueous mixture to a first elevated temperature for a first period of time to form the gel.

Feature 14. The method according to any one of Features 1-17 and 21-28, wherein the first elevated temperature is about 50° C. to 100° C., about 60° C. to 90° C., or about 65° C. to 80° C.; and wherein the first period of time is about 3 hours to 10 hours or about 4 hours to 8 hours.

Feature 15. The method according to any one of Features 1-17 and 21-28, wherein the calcining step comprises heating the gel to a second elevated temperature for a second period of time to remove the portion of the organic material.

Feature 16. The method according to any one of Features 1-17 and 21-28, wherein the portion is substantially all of the organic material.

Feature 17. The method according to any one of Features 1-17 and 21-28, wherein the second elevated temperature is selected from the group consisting of about 400° C. to 1200° C., about 500° C. to 1100° C., or about 600° C. to 1000° C.; and wherein the second period of time is about 10 hours.

Feature 18. A plurality of perovskite manganese oxide particles produced by a method according to any one of Features 1-17 and 21-28.

Feature 19. A plurality of perovskite manganese oxide particles, wherein the plurality of particles has an average crystallite size of about 25 nm to 75 nm when measured according to the Sherrer equation using the highest intensity peak in the X-ray diffraction of the plurality of particles; and wherein the plurality of particles has an average particle size of about 25 nm to 125 nm when measured by transmission electron microscopy.

Feature 20. The plurality of particles according to Feature 19, wherein the plurality of particles are made by a method according to any one of Features 1-17 and 21-28.

Feature 21. The plurality of particles according to any one of Features 18-28 or the methods according to any one of Features 1-17 and 21-28, wherein the plurality of particles have a particle-like morphology.

Feature 22. The plurality of particles according to any one of Features 18-28 or the methods according to any one of Features 1-17 and 21-28, wherein the perovskite manganese oxide comprises a metal selected from the group consisting of Lanthanum (La), Cerium (Ce), Praseodymium (Pr), Calcium (Ca), Strontium (Sr), Barium (Ba), and a combination thereof.

Feature 23. The plurality of particles according to any one of Features 18-28 or the methods according to any one of Features 1-17 and 21-28, wherein the perovskite manganese oxide particles comprise a doped manganese oxide comprising a trivalent rare-earth metal and a divalent metal; and wherein a molar ratio of a first total amount of Mn to a second total amount of trivalent rare-earth metal and divalent metal in the aqueous perovskite manganese oxide particles is about 1.

Feature 24. The plurality of particles according to any one of Features 18-28 or the methods according to any one of Features 1-17 and 21-28, wherein the perovskite manganese oxide particles comprise $La_{1-x}Ca_xMnO_3$, wherein x is about 0.1 to 0.5.

Feature 25. The plurality of particles according to any one of Features 18-28 or the methods according to any one of Features 1-17 and 21-28, wherein the perovskite manganese oxide particles comprise $La_{1-x}Sr_xMnO_3$, wherein x is about 0.1 to 0.5.

Feature 26. The plurality of particles according to any one of Features 18-28 or the methods according to any one of Features 1-17 and 21-28, wherein the perovskite manganese oxide particles have a relative cooling power (RCP) of about 600 J Kg$^{-1}$ to 1600 J Kg$^{-1}$ at 278 K for a field change of 0-3 T.

Feature 27. The plurality of particles according to any one of Features 18-28 or the methods according to any one of Features 1-17 and 21-28, wherein the perovskite manganese oxide particles have a magnetic entropy $(-\Delta S_M)$ of about 10 Jkg$^{-1}$K$^{-1}$ to about 30 Jkg$^{-1}$K$^{-1}$ or about 15 Jkg$^{-1}$K$^{-1}$ to about 30 Jkg$^{-1}$K$^{-1}$ when measured at 278 K for a field change of 0-3 T.

Feature 28. The plurality of particles according to any one of Features 18-28 or the methods according to any one of Features 1-17 and 21-28, wherein the perovskite manganese oxide particles comprise $La_{1-x}Ca_xMnO_3$ or $La_{1-x}Sr_xMnO_3$, wherein x is about 0.1 to 0.5; wherein the metal salts or hydrates thereof further comprise La and Ca or Sr; wherein the low-molecular-weight polymeric polyalcohol gel precursor comprises a low-molecular-weight polyethylene glycol having a number average molecular weight of about 400 Daltons to about 1000 Daltons; wherein the plurality of particles has an average crystallite size of about 25 nm to 75 nm when measured according to the Sherrer equation using the highest intensity peak in the X-ray diffraction of the plurality of particles; wherein the plurality of particles has an average particle size of about 25 nm to 125 nm when measured by transmission electron microscopy; wherein the perovskite manganese oxide particles have a relative cooling power (RCP) of about 600 J Kg-1 to 1600 J Kg -1 and a magnetic entropy $(-\Delta S_M)$ of about 15 Jkg$^{-1}$K$^{-1}$ to about 30 Jkg$^{-1}$K$^{-1}$ when measured at 278 K for a field change of 0-3 T.

Feature 29. A magnetic refrigeration device comprising a refrigerant material comprising a plurality of perovskite manganese oxide particles according to any one of Features 18-28.

Feature 30. A method of active magnetic refrigeration, the method comprising applying an oscillating magnetic field to a plurality of perovskite manganese oxide particles according to any one of Features 18-28.

Feature 31. A method of generating electricity, the method comprising applying heat from a heat source to a plurality of perovskite manganese oxide particles according to any one of Features 18-28.

Feature 32. A power generation device comprising: a hot fluid source in thermal communication with a heat source, a cold fluid source in thermal communication with a heat sink, and a first thermomagnetic generator comprising a plurality of perovskite manganese oxide particles according to any one of Features 18-28, wherein a first temperature around the plurality of perovskite manganese oxide particles can be oscillated from a relatively hot temperature to a relatively cold temperature using the hot fluids source and the cold fluid source; and wherein the first oscillating temperature causes a permeability of the perovskite manganese oxide particles to oscillate thereby generating the power from the first thermomagnetic generator.

Feature 33. The power generation device according to any one of Features 32-37, further comprising: a second thermomagnetic generator analogous to the first thermomagnetic generator; a plurality of fluid conduits connecting the hot fluid source and the cold fluid source to both the first thermomagnetic generator and the second thermomagnetic generator through a flow controller; wherein the flow controller oscillates the amount of the hot fluid source and the amount of the cold fluid source going to the first thermomagnetic generator and the second thermomagnetic generator; wherein the oscillating of the hot fluid source and the cold fluid source causes a second temperature around the plurality of perovskite manganese oxide particles in the second thermomagnetic generator to oscillate; and wherein the second oscillating temperature causes a permeability of the perovskite manganese oxide particles in the second thermomagnetic generator to oscillate thereby generating power from the second thermomagnetic generator.

Feature 34. The power generation device according to any one of Features 32-37, wherein the plurality of perovskite manganese oxide particles is in a packed bed in the thermomagnetic generators.

Feature 35. The power generation device according to any one of Features 32-37, wherein the plurality of perovskite manganese oxide particles are coated with a protective films or are in a sealed container so as to not be in direct contact with the fluid sources.

Feature 36. The power generation device according to any one of Features 32-37, wherein a difference between the relatively hot temperature and the relatively cold temperature is about 50° C., about 35°, about 20° C., about 15° C., or less.

Feature 37. The power generation device according to any one of Features 32-37, wherein one or both of the hot fluid source and the cold fluid source comprise water.

Feature 38. A refrigeration device comprising: an active magnetic regenerator (AMR) comprising a plurality of perovskite manganese oxide particles according to any one of Features 18-28; a magnetic field generator causing a magnetic field at the perovskite manganese oxide particles in the AMR to oscillate between a relatively high field and a relatively low field; a cold side heat exchanger and a hot side heat exchanger, each in thermal communication with the AMR; wherein the oscillation between the relatively high field and the relatively low field causes the perovskite manganese oxide particles to direct heat from the cold side heat exchanger to the hot side heat exchanger.

Feature 39. The refrigeration device according to any one of Features 29 and 38-41, wherein the AMR is stationary within the device and the magnetic field generator moves in relation to the AMR to cause the magnetic field to oscillate between the relatively high field and the relatively low field.

Feature 40. The refrigeration device according to any one of Features 29 and 38-41, wherein the magnetic field generator is stationary within the device and the AMR moves in relation to the magnetic field generator causing the magnetic field to oscillate between the relatively high field and the relatively low field.

Feature 41. The refrigeration device according to to any one of Features 29 and 38-41, wherein the AMR is stationary within the device and the magnetic field generator comprises an electromagnetic source that is oscillated to cause the magnetic field to oscillate between the relatively high field and the relatively low field.

I claim:

1. A method of making perovskite manganese oxide particles having a strong magnetocaloric effect, the method comprising:
    forming an aqueous mixture comprising (i) a low-molecular-weight polymeric polyalcohol gel precursor, (ii) a stoichiometric amount of metal salts or hydrates thereof, wherein the metal salts or hydrates thereof comprise at least a Manganese (Mn), and (iii) a polybasic carboxylic acid;
    polymerizing the aqueous mixture to form a gel comprising perovskite manganese oxide nanoparticles entrapped therein; and calcining the gel to remove at least a portion of organic material in the gel and form the perovskite manganese oxide particles.

2. The method according to claim 1, wherein the low-molecular-weight polymeric polyalcohol gel precursor comprises a low-molecular-weight polyethylene glycol.

3. The method according to claim 1, wherein the low-molecular-weight polymeric polyalcohol gel precursor comprises a low-molecular-weight polyvinyl alcohol.

4. The method according to claim 1, wherein the metal salts or hydrates thereof comprise a metal hydroxide, a metal alkoxide, a metal acetate, a metal chloride, a metal citrate, a metal nitrate, or a combination thereof.

5. The method according to claim 1, wherein the metal salts or hydrates thereof further comprise a metal selected from the group consisting of Lanthanum (La), Cerium (Ce), Praseodymium (Pr), Neodymium (Nd), Gadolinium (Gd), Calcium (Ca), Strontium (Sr), Barium (Ba), and a combination thereof.

6. The method according to claim 1, wherein the perovskite manganese oxide particles comprise a doped manganese oxide;
wherein the metal salts or hydrates thereof further comprise a trivalent rare-earth metal and a divalent metal; and
wherein a molar ratio of a first total amount of Mn to a second total amount of trivalent rare-earth metal and divalent metal in the aqueous mixture is about 1.

7. The method according to claims 1, wherein the perovskite manganese oxide particles comprise $La_{1-x}Ca_xMnO_3$, wherein x is about 0.1 to 0.5; and
wherein the metal salts or hydrates thereof further comprise La and Ca.

8. The method according to claim 1, wherein the perovskite manganese oxide particles comprise $La_{1-x}Sr_xMnO_3$, wherein x is about 0.1 to 0.5; and
wherein the metal salts or hydrates thereof further comprise La and Sr.

9. The method according to claim 1, wherein the polybasic carboxylic acid is selected from the group consisting of citric acid, glycolic acid, tartaric acid, maleic acid, hydroxymaleic acid, hydroxytartaric acid, malonic acid, malic acid, lactic acid, tartronic acid, gluconic acid, saccharic acid, glucuronic acid, mucic acid, mannosaccharic acid, and a combination thereof.

10. The method according to claim 1, wherein the low-molecular-weight polymeric polyalcohol gel precursor is present in the aqueous mixture at a weight ratio (w/w) of the low-molecular-weight polymeric polyalcohol gel precursor to the metal of about 1:10.

11. The method according to claims 1, wherein each of the metal salts or the hydrate thereof is present in the aqueous mixture at a concentration of about 0.1 M to 1.0 M.

12. The method according to claim 1, wherein the polybasic carboxylic acid is present in the aqueous mixture at a weight ratio (w/w) of the polybasic carboxylic acid to the metal of about 1:10.

13. The method according to claim 1, wherein the polymerizing step comprises one or both of (i) lowering the pH of the aqueous mixture by the addition of an acid and (ii) heating the aqueous mixture to a first elevated temperature for a first period of time to form the gel.

14. The method according to claim 13, wherein the first elevated temperature is about 50° C. to 100° C., about 60° C. to 90° C., or about 65° C. to 80° C.; and
wherein the first period of time is about 3 hours to 10 hours or about 4 hours to 8 hours.

15. The method according to claim 1, wherein the calcining step comprises heating the gel to a second elevated temperature for a second period of time to remove the portion of the organic material.

16. The method according to claim 15, wherein the portion is substantially all of the organic material.

17. The method according to claim 15, wherein the second elevated temperature is selected from the group consisting of about 400° C. to 1200° C., about 500° C. to 1100° C., or about 600° C. to 1000° C.; and
wherein the second period of time is about 10 hours.

18. A plurality of perovskite manganese oxide particles produced by the method according to claim 1.

19. The plurality of particles according to claim 18, wherein the plurality of particles has a particle-like morphology.

20. The plurality of particles according to claim 18, wherein the perovskite manganese oxide comprises a metal selected from the group consisting of Lanthanum (La), Cerium (Ce), Praseodymium (Pr), Calcium (Ca), Strontium (Sr), Barium (Ba), and a combination thereof.

21. The plurality of particles according to claim 18, wherein the perovskite manganese oxide particles comprise a doped manganese oxide comprising a trivalent rare-earth metal and a divalent metal; and
wherein a molar ratio of a first total amount of Mn to a second total amount of trivalent rare-earth metal and divalent metal in the aqueous perovskite manganese oxide particles is about 1.

22. The plurality of particles according to claim 18, wherein the perovskite manganese oxide particles comprise $La_{1-x}Ca_xMnO_3$, wherein x is about 0.1 to 0.5.

23. The plurality of particles according to claim 18, wherein the perovskite manganese oxide particles comprise $La_{1-x}Sr_xMnO_3$, wherein x is about 0.1 to 0.5.

24. The plurality of particles according to claim 18, wherein the perovskite manganese oxide particles have a relative cooling power (RCP) of about 600 J $Kg^{-1}$ to 1600 J $Kg^{-1}$ at 278 K for a field change of 0-3 T.

25. The plurality of particles according to claim 18, wherein the perovskite manganese oxide particles have a magnetic entropy ($-\Delta S_M$) of about 10 $Jkg^{-1}K^{-1}$ to about 30 $Jkg^{-1}K^{-1}$ or about 15 $Jkg^{-1}K^{-1}$ to about 30 $Jkg^{-1}K^-1$ when measured at 278 K for a field change of 0-3 T.

26. The plurality of particles according to claim 18, wherein the perovskite manganese oxide particles comprise $La_{1-x}Ca_xMnO_3$ or $La_{1-x}Sr_xMnO_3$, wherein x is about 0.1 to 0.5;
wherein the metal salts or hydrates thereof further comprise La and Ca or Sr;
wherein the low-molecular-weight polymeric polyalcohol gel precursor comprises a low-molecular-weight polyethylene glycol having a number average molecular weight of about 400 Daltons to about 1000 Daltons;
wherein the plurality of particles has an average crystallite size of about 25 nm to 75 nm when measured according to the Sherrer equation using the highest intensity peak in the X-ray diffraction of the plurality of particles;
wherein the plurality of particles has an average particle size of about 25 nm to 125 nm when measured by transmission electron microscopy;
wherein the perovskite manganese oxide particles have a relative cooling power (RCP) of about 600 J Kg-1 to 1600 J Kg -1 and a magnetic entropy ($-\Delta S_M$) of about 15 $Jkg^{-1}K^{-1}$ to about 30 $Jkg^{-1}K^-1$ when measured at 278 K for a field change of 0-3 T.

27. A magnetic refrigeration device comprising a refrigerant material comprising a plurality of perovskite manganese oxide particles according to claim 18.

28. A method of active magnetic refrigeration, the method comprising applying an oscillating magnetic field to a plurality of perovskite manganese oxide particles according to claim 18.

29. A method of generating electricity, the method comprising applying heat from a heat source to a plurality of perovskite manganese oxide particles according to claim 18.

30. A plurality of perovskite manganese oxide particles, wherein the plurality of particles has an average crystallite size of about 25 nm to 75 nm when measured according to the Sherrer equation using the highest intensity peak in the X-ray diffraction of the plurality of particles; and wherein the plurality of particles has an average particle size of about 25 nm to 125 nm when measured by transmission electron microscopy.

* * * * *